(12) United States Patent
Yamamoto et al.

(10) Patent No.: US 8,477,580 B2
(45) Date of Patent: Jul. 2, 2013

(54) OBJECTIVE LENS, OPTICAL PICKUP, AND OPTICAL DRIVE DEVICE

(75) Inventors: Kenji Yamamoto, Kanagawa (JP); Noriaki Nishi, Kanagawa (JP); Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 13/225,764

(22) Filed: Sep. 6, 2011

(65) Prior Publication Data
US 2012/0063287 A1  Mar. 15, 2012

(30) Foreign Application Priority Data
Sep. 13, 2010 (JP) ................. 2010-204121

(51) Int. Cl.
*G11B 7/095* (2006.01)
*G11B 7/135* (2012.01)

(52) U.S. Cl.
USPC ............. 369/53.19; 369/44.23; 369/112.23; 369/112.24; 369/44.11

(58) Field of Classification Search
USPC .......... 369/13.39, 44.11, 44.14, 53.13, 53.14, 369/44.17, 44.19, 44.23, 44.25, 44.32, 53.19; 359/811
See application file for complete search history.

(56) References Cited

U.S. PATENT DOCUMENTS
2008/0205257 A1   8/2008  Yamatsu et al.
2010/0188960 A1*  7/2010  Yasui ...................... 369/112.23
2011/0182167 A1*  7/2011  Ogata et al. ............. 369/112.24

FOREIGN PATENT DOCUMENTS
JP  2008-097681 A   4/2008
JP  2008-135144 A   6/2008
JP  2008-176902 A   7/2008
JP  2008-262702 A   10/2008

* cited by examiner

*Primary Examiner* — Wayne Young
*Assistant Examiner* — Dionne Pendleton
(74) *Attorney, Agent, or Firm* — Wolf, Greenfield & Sacks, P.C.

(57) ABSTRACT

Provided is an objective lens, which is provided in an optical pickup including a spherical aberration correction mechanism which performs a spherical aberration correction with respect to laser light applied to a recording layer of an optical recording medium, having the recording layer on which information can be recorded at a plurality of positions in a depth direction, via the objective lens, and a tilt correction unit which varies a lens tilt angle which is a tilt angle of the objective lens, thereby performing a tilt correction.

8 Claims, 15 Drawing Sheets

OBJECTIVE LENS, OPTICAL PICKUP, AND OPTICAL DRIVE DEVICE

BACKGROUND

The present disclosure relates to an objective lens, an optical pickup, and an optical drive device.

As optical recording media for recording and reproduction signals using light irradiation, so-called optical discs such as, for example, a CD (Compact Disc), a DVD (Digital Versatile Disc), a BD (Blu-ray Disc: registered trademark), and the like have become spread.

The present applicant has proposed a so-called bulk recording type optical recording medium as disclosed in Japanese Unexamined Patent Application Publication No. 2008-135144 or Japanese Unexamined Patent Application Publication No. 2008-176902 with regard to optical recording media which lead the next generation of optical recording media which are widespread at present such as the CDs, the DVDs, the BDs, and the like.

Here, the bulk recording is a technique in which, for example, as shown in FIG. 10, laser light irradiation is performed for an optical recording medium (a bulk type recording medium 100) having at least a cover layer 101 and a bulk layer (recording layer) 102 while sequentially changing focal positions and thus multi-layer recording is performed inside the bulk layer 102, thereby achieving a large recording capacity.

For such bulk recording, a recording technique called a micro hologram type is disclosed in Japanese Unexamined Patent Application Publication No. 2008-135144.

In the micro hologram type, a so-called hologram recording material is used as a recording material of the bulk layer 102. As the hologram recording material, for example, light cured photopolymer is widely used.

The micro hologram type is largely classified into a positive micro hologram type and a negative micro hologram type.

The positive micro hologram type is a method in which two light beams opposite to each other are collected at the same position so as to form fine interference fringes (holograms), which are used as recording marks.

In addition, the negative micro hologram type is a method in which, in contrast to the positive micro hologram type, interference fringes which are formed in advance are erased by laser light irradiation, and the erased portions are used as recording marks. Specifically, in the negative micro hologram type, an initialization process for forming interference fringes on the bulk layer 102 in advance is performed before a recording operation is performed. The initialization process is performed by irradiating the bulk layer 102 with two light beams by parallel light to be opposite to each other, and forming interference fringes on the overall bulk layer 102. During recording, in a state of focusing on an arbitrary layer position of the bulk layer 102 on which the interference fringes are formed as described above, information is recorded using the erasure marks by performing laser light irradiation according to recording information.

Further, the present applicant has proposed a recording method of forming voids (vacancies) as recording marks, as disclosed in, for example, Japanese Unexamined Patent Application Publication No. 2008-176902, as a method of the bulk recording different from the micro hologram type.

The void recording method is a method in which laser light irradiation is performed for the bulk layer 102 made of a recording material such as, for example, light cured photopolymer at relatively high power, thereby forming voids (vacancies) inside the bulk layer 102. As disclosed in Japanese Unexamined Patent Application Publication No. 2008-176902, the vacancy portions formed in this way have a refractive index different from other portions in the bulk layer 102, and thus reflectance of light at the interfaces can be heightened. Therefore, the vacancy portions function as recording marks, and thereby information recording is realized by the formation of the vacancy marks.

Since the void recording type does not form holograms, recording may be completed through light irradiation from one side. In other words, it is not necessary to collect two light beams at the same position and form recording marks unlike the positive micro hologram type.

Upon comparison with the negative micro hologram type, there is an advantage in that the initialization process is not necessary.

In addition, although an example where when void recording is performed, pre-cure light is applied before the recording is described in Japanese Unexamined Patent Application Publication No. 2008-176902, void recording can be performed even if the application of the pre-cure light is omitted.

However, a recording layer (a bulk layer) of a bulk recording type (hereinafter, simply referred to as a bulk type) optical disc recording medium where the above-described variety of recording methods are proposed does not have an explicit multi-layer structure in the meaning that, for example, a plurality of reflection layers are formed. That is to say, the bulk layer 102 is not provided with a reflection layer and a guide groove for each recording layer which a typical multi-layer disc has.

Therefore, in a state of the structure of the bulk type recording medium 100 shown in FIG. 10 described above, a focus servo or a tracking servo may not be performed during the recording where the marks are not formed.

For this reason, in practice, the bulk type recording medium 100 is provided with a reflection surface (reference surface) which has guided grooves as shown in FIG. 11 and is used as a reference.

Specifically, guide grooves (position guiders) by, for example, formation of pits or grooves are formed at the lower surface side of the cover layer 101 in a spiral shape or a concentric shape, and a selective reflection layer 103 is formed thereon. In addition, the bulk layer 102 is laminated on the lower layer side of the cover layer 101 where the selective reflection layer 103 is formed in this way, via an adhesive material such as, for example, a UV cured resin as an intermediate layer 104 in the figure.

Here, absolute position information (address information) such as, for example, radius position information or rotation angle information is recorded through the formation of the guide grooves by the pits or grooves as described above. In the following description, a face (in this case, the face on which the selective reflection layer 103 is formed) where the guide grooves are formed and absolute position information is recorded is referred to as a "reference face Ref". In addition, the "reference face Ref" may be referred to as a "servo signal face".

After the above-described medium structure is formed, as shown in FIG. 12, the bulk type recording medium 100 is irradiated with servo laser light (also simply referred to as servo light) as laser light for position control independently from laser light for recording marks (or reproduction of marks) (hereinafter, also simply referred to as recording and reproduction laser light or recording and reproduction light).

As shown in the figure, the recording and reproduction laser light and the servo laser light are applied to the bulk type recording medium 100 via a common objective lens.

At this time, if the servo laser light reaches the bulk layer 102, there is concern that the servo laser light has an adverse effect on the mark recording in the bulk layer 102. For this reason, in the bulk recording type in the related art, laser light having a wavelength band different from that of the recording and reproduction laser light is used as the servo laser light, and, as a reflection layer formed on the reference face Ref, the selective reflection layer 103 having wavelength selectivity of reflecting servo laser light and transmitting recording and reproduction laser light therethrough is provided.

Based on the above-described premise, an operation of when marks are formed on the bulk type recording medium 100 will be described with reference to FIG. 12.

First, when multi-layer recording is performed for the bulk layer 102 where the guide grooves or the reflection layer is not formed, on which layer position marks are recorded in the depth direction of the bulk layer 102 is set in advance. In the figure, a case is exemplified in which a total of five information recording layer positions L, first information recording layer position L1 to fifth information recording layer position L5 are set as layer positions on which marks are formed (mark forming layer positions: also referred to as information recording layer positions) in the bulk layer 102. As shown in the figure, the first information recording layer position L1 is the information recording layer position L set at the uppermost part, and, thereafter, the information recording layer positions L2, L3, L4 and L5 are sequentially the information recording layer positions L set at the lower layer side.

Here, the information recording layer positions L may also be represented as "information recording depth".

In addition, here, for convenience of illustration, although a case where the number of the information recording layer positions L is five is exemplified, in practice, the number of the information recording layer positions L is expected to be, for example, on the order of several tens.

Here, during recording where the marks are not formed, a focus servo or a tracking servo may not be performed for each layer position in the bulk layer 102 based on reflection light of the recording and reproduction laser light. Therefore, a focus servo control and a tracking servo control of the objective lens during the recording are performed such that a spot position of the servo laser light tracks the guided grooves on the reference face Ref based on reflection light of the servo laser light.

However, it is necessary for the recording and reproduction laser light to reach the bulk layer 102 formed at the lower layer side of the reference face Ref for the mark recording, and further a focus position in the bulk layer 102 can be selected. For this reason, an optical system in this case is provided with a focus mechanism (independent recording and reproduction light focus mechanism) for independently adjusting a focus state of the recording and reproduction laser light separately from the focus mechanism of the objective lens.

Here, an outline of an optical system for performing recording and reproduction of the bulk type recording medium 100 including the recording and reproduction light focus mechanism is shown in FIG. 13.

As shown in FIG. 13, an objective lens also shown in FIG. 12 can be displaced in the radius direction of the bulk type recording medium 100 (tracking direction) and the direction coming into contact with and separating from the bulk type recording medium 100 (focus direction) by a biaxial actuator.

In FIG. 13, the independent recording and reproduction light focus mechanism in this case is a mechanism of a type called an expander, and, as shown, includes a fixed lens, and a movable lens which is held so as to be displaced in a direction parallel to the optical axis of the recording and reproduction laser light by a lens driving unit. In the independent recording and reproduction light focus mechanism, the lens driving unit drives the movable lens such that collimation of the recording and reproduction laser light incident to the objective lens in the figure varies, and thereby a focal position of the recording and reproduction laser light is adjusted independently from the servo laser light.

Further, since, as described above, the recording and reproduction laser light and the servo laser light have wavelength bands different from each other, reflection light beams of the recording and reproduction laser light and the servo laser light from the bulk type recording medium 100 are separated toward respective systems (that is, the respective reflection light beams can be detected independently from each other) by a dichroic prism of the figure in the optical system in this case so as to corresponding thereto.

In a case of light on the outgoing path, the dichroic prism has a function of synthesizing the recording and reproduction laser light and the servo laser light on the same axis and enabling the synthesized light to be incident to the objective lens. Specifically, in this case, as shown in the figure, the recording and reproduction laser light is reflected by a mirror via the independent recording and reproduction light focus mechanism, is reflected by a selective reflection surface of the dichroic prism, and then is incident to the objective lens. On the other hand, the servo laser light passes through the selective reflection surface of the dichroic prism and then is incident to the objective lens.

FIG. 14 is a diagram illustrating a servo control during reproduction of the bulk type recording medium 100.

When the bulk type recording medium 100 on which marks have been recorded is reproduced, it is not necessary to control a position of the objective lens based on reflection light of the servo laser light unlike the recording. In other words, during the reproduction, it is preferable to perform a focus servo control and a tracking servo control of the objective lens based on reflection light of the recording and reproduction laser light by targeting a mark string formed on the information recording layer positions L (also referred to as information recording layers L or mark forming layers L during the reproduction) to be reproduced.

As described above, in the bulk recording type, the recording and reproduction laser light for recording and reproduction the marks and the servo light as position control light are applied to the bulk type recording medium 100 through the common objective lens (through the synthesis on the same optical axis), and, during the recording, the focus servo control and the tracking servo control are performed such that the servo laser light tracks the position guiders on the reference face Ref. In addition, the mark recording can be performed at necessary positions (the depth direction and the tracking direction) inside the bulk layer 102 by separately adjusting a focus state of the recording and reproduction laser light using a spherical aberration correction mechanism even if guide grooves are not formed in the bulk layer 102.

Further, during the reproduction, the focus servo control and the tracking servo control of the objective lens are performed based on reflection light of the recording and reproduction laser light such that a focal position of the recording and reproduction laser light tracks the mark string which has been recorded, and thereby it is possible to reproduce the marks recorded in the bulk layer 102.

However, according to the structure of the bulk type recording medium 100 shown in FIG. 11, the bulk layer 102 is provided via the cover layer 101 having the necessary thickness, and thus it is necessary to correct spherical aberration when marks are recorded and reproduced at the respective layer positions L in the bulk layer 102. That is to say, in this case, since the cover thickness is different for each layer position L, the correction of the spherical aberration is performed such that the correction amount is different for each layer position L.

In the optical system shown in FIG. 13, the independent recording and reproduction light focus mechanism performs the correction of spherical aberration along with the adjustment of a focal position. Specifically, the correction of spherical aberration is performed by making an offset (defocus) of a focal position of the recording and reproduction laser light from the layer position L which is a target of recording and reproduction by a predetermined amount.

Here, as such, the drive device of the bulk type recording medium 100 performs the spherical aberration correction according to the difference in the cover thicknesses (that is, the difference in the information recording layer positions L); however, which layer position L is used as a reference of the spherical aberration correction is important when the spherical aberration correction is performed for each layer position L.

For example, if an optical system is designed such that the spherical aberration for the information recording layer position L1 which is the uppermost layer is minimized, the correction amount of the spherical aberration become excessive when recording targeting the information recording layer position L5 is performed. Particularly, in the bulk recording type, as the thickness of the bulk layer 102, for example, about 200 μm to 300 μm is now under review in order to achieve a large recording capacity through the multiple layers, and, in this case, it is necessary to perform a large spherical aberration correction so as to correspond to the thickness of 300 μm to the maximum.

Therefore, the optical system is designed such that the spherical aberration is minimized at the layer position L which is intermediate in the bulk layer 102. According thereto, the maximal correction amount of the spherical aberration necessary when recording and reproduction are performed in the same range of the information recording layer positions L1 to L5 can be suppressed to a half of a case of designing the optical system using the information recording layer position L1 as a reference.

Hereinafter, as such, the layer position L (layer position L minimizing the spherical aberration) used as a reference in the design of the optical system when the spherical aberration correction is performed is referred to as a reference layer position.

As can be seen from the above description, the drive device of the bulk type recording medium 100 is configured so as to correct the spherical aberration occurring due to an error between an layer position L which is a target of recording and reproduction and the reference layer position (in this case, L3).

Although description using illustration is omitted, on the other hand, an actual drive device is configured to perform a tilt correction by tilting the objective lens (so-called lens tilt) so as to handle the disc tilt.

Specifically, as a tilt detection, for example, a tilt of the bulk type recording medium 100 is detected, and, a tilt mechanism which tilts the objective lens is driven according to the detection result, thereby performing the tilt correction (comatic aberration correction).

SUMMARY

However, in the drive device of the bulk type recording medium 100 which performs the spherical aberration correction and the tilt correction through the lens tilt described above, it is difficult to maintain stable recording and reproduction performance for all the information recording layer positions L.

This is because the drive device of the bulk type recording medium 100 is forced to perform a relatively large spherical aberration correction so as to correspond to an error such as a maximum of 150 μm (300 μm/2).

This will be described with reference to FIGS. 15A to 15F.

First, as a premise, the tilt correction through the lens tilt described above indicates that a spot position of laser light applied via the objective lens is deviated from the optical axis of the objective lens accordingly, and thus image height varies. Based on the premise, FIGS. 15A to 15F respectively show an image height characteristic (FIG. 15A) when a spherical aberration correction corresponding to an error −100 μm from the reference layer position is performed, an image height characteristic (FIG. 15B) when a spherical aberration correction corresponding to an error 0 μm from the reference layer position is performed (that is, the correction amount=0), and an image height characteristic (FIG. 15C) when a spherical aberration correction corresponding to an error +100 μm from the reference layer position is performed.

In addition, for comparison therewith, FIGS. 15D to 15F show lens tilt characteristics in a case where the spherical aberration correction is performed, respectively, in the three conditions. The lens tilt characteristic indicates an aberration characteristic of laser light when the bulk type recording medium 100 is not tilted but only the objective lens is tilted, and, is resultantly equivalent to an aberration characteristic when the tilt correction is not performed.

Here, FIGS. 15A to 15F show a spherical aberration characteristic (plots using square marks), a comatic aberration characteristic (plots using triangular marks), and an astigmatism characteristic (plots using X marks) as the image height characteristic and the lens tilt characteristic.

For example, when attention is paid to the comatic aberration in FIGS. 15A to 15F, it can be seen from the comparison of FIGS. 15A to 15C with FIGS. 15D to 15F that the comatic aberration is corrected by performing the tilt correction.

However, even if the tilt correction in FIGS. 15A to 15C is performed, upon comparison with the case of the error 0 μm shown in FIG. 15B, it can be seen that the comatic aberration tends to increase in the case of the error ±100 μm shown in FIGS. 15A and 15C.

The drive device of the bulk type recording medium 100 which performs the spherical aberration correction and the tilt correction through the lens tilt in this way has a problem in that, particularly, a large comatic aberration occurs in the situation of performing a large spherical aberration correction so as to correspond to the uppermost portion or the lowermost portion of the bulk layer 102.

It is desirable to improve image forming performance of laser light and further improve a recording and reproduction performance by providing an objective lens having a better image height characteristic, in a drive device of a bulk type optical recording medium which performs the spherical aberration correction and the tilt correction through the lens tilt as described above.

An objective lens according to an embodiment of the present disclosure has the following configuration.

That is to say, the objective lens is provided in an optical pickup including a spherical aberration correction mechanism which performs a spherical aberration correction with respect to laser light applied to a recording layer of an optical recording medium, having the recording layer on which information can be recorded at a plurality of positions in a depth direction, via the objective lens, and a tilt correction unit which varies a lens tilt angle which is a tilt angle of the objective lens, thereby performing a tilt correction. In addition, the objective lens is designed as follows.

That is to say, when a third-order spherical aberration variation (λrms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation (λrms) generated by the lens tilt angle Ltilt is denoted by $\Delta CA$, and a relationship therebetween is given by $\Delta CA/Ltilt = \alpha * \Delta SA$, the objective lens is designed such that a value of $\alpha$ has a value in an allowable difference range which has an ideal value indicated by $\alpha = -6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum.

In addition, an optical pickup according to another embodiment of the present disclosure has the following configuration.

That is to say, the optical pickup includes a spherical aberration correction mechanism that performs a spherical aberration correction with respect to laser light applied to a recording layer of an optical recording medium, having the recording layer on which information can be recorded at a plurality of positions in a depth direction, via an objective lens; and a tilt correction unit that varies a lens tilt angle which is a tilt angle of the objective lens, thereby performing a tilt correction.

In addition, the objective lens is designed as follows.

That is to say, when a third-order spherical aberration variation (λrms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation (λrms) generated by the lens tilt angle Ltilt is denoted by $\Delta CA$, and a relationship therebetween is given by $\Delta CA/Ltilt = \alpha * \Delta SA$, the objective lens is designed such that a value of $\alpha$ has a value in an allowable difference range which has an ideal value indicated by $\alpha = -6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum.

Further, an optical drive device according to still another embodiment has the following configuration.

That is to say, the optical drive device has the following optical pickup, and performs information recording and/or reproduction for an optical recording medium having a recording layer on which information can be recorded at a plurality of positions in a depth direction.

That is to say, the optical pickup includes a spherical aberration correction mechanism that performs a spherical aberration correction with respect to laser light applied to the recording layer via an objective lens; and a tilt correction unit that varies a lens tilt angle which is a tilt angle of the objective lens, thereby performing a tilt correction, wherein, when a third-order spherical aberration variation (λrms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation (λrms) generated by the lens tilt angle Ltilt is denoted by $\Delta CA$, and a relationship therebetween is given by $\Delta CA/Ltilt = \alpha * \Delta SA$, the objective lens is designed such that a value of $\alpha$ has a value in an allowable difference range which has an ideal value indicated by $\alpha = -6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum.

The objective lens according to the embodiment of the present disclosure can maintain a high performance based on the Marechal criterion as an image forming performance of laser light even in a worst condition that an error of a condensed position of the laser light from the reference layer position is the maximum and further the tilt is the maximum.

As described above, according to the present disclosure, it is possible to maintain a high performance based on the Marechal criterion as an image forming performance of laser light even in a worst condition that a condensed position of laser light is maximally spaced apart from a reference layer position set in a recording layer and further the tilt is the maximum. Thereby, it is possible to improve a recording and reproduction performance in a drive device of a bulk type recording medium performing a spherical aberration correction and a tilt correction through a lens tilt.

In addition, according to the present disclosure, it is possible to handle an increase in the thickness of the recording layer in proportion to the improvement in the image height characteristic of the objective lens, thereby achieving a novel large recording capacity.

DETAILED DESCRIPTION OF EMBODIMENTS

Hereinafter, embodiments of the present disclosure will be described.

Figure 1:
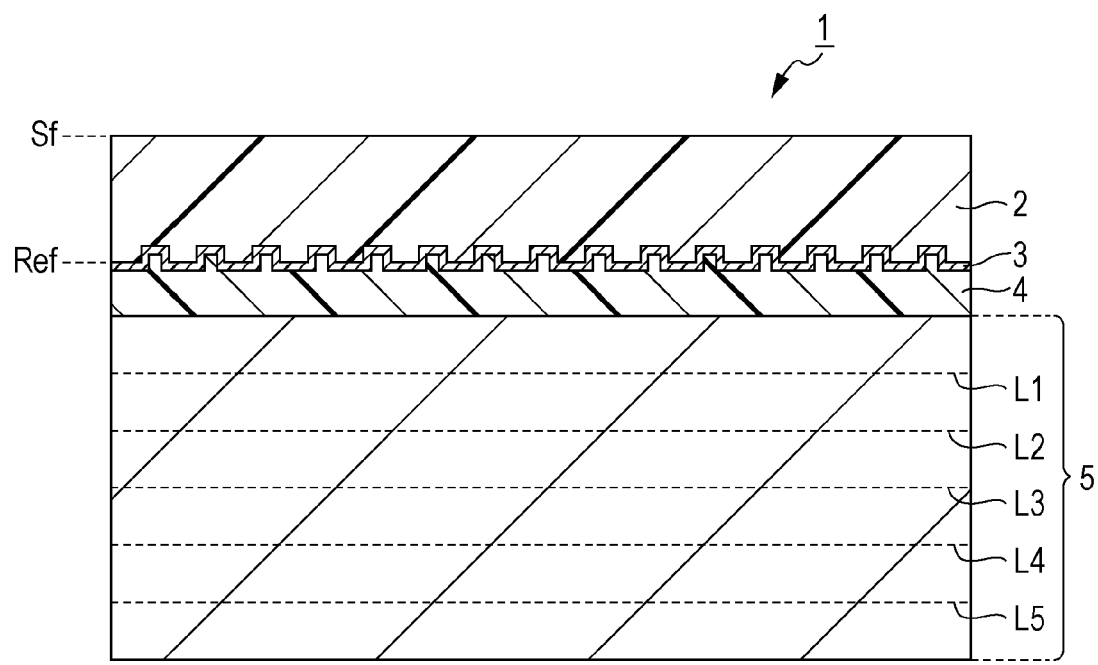
FIG. 1 is a cross-sectional structural view of an optical recording medium which is a target of recording and reproduction according to an embodiment.

The description will be made in the following order.
1. Optical Recording Medium to be Recorded and Reproduced
2. Configuration of Optical Drive Device
2-1. Internal Configuration of Optical Pickup
2-2. Overall Internal Configuration of Optical Drive Device
2-3. Adjustment of Focal Position of Recording and Reproduction Laser Light
3. Design of Objective Lens
3-1. Detailed Design Guideline
3-2. Embodiment 1: Design Example of Two-Group Configuration
3-3. Embodiment 2: Design Example of Three-Group Configuration
4. Modified Example
1. Optical Recording Medium to be Recorded and Reproduced According to Embodiment FIG. 1 is a cross-sectional structural view of an optical recording medium which is a target of recording and reproduction according to an embodiment.

The optical recording medium which is a target of recording and reproduction according to an embodiment is a so-called bulk recording type optical recording medium and is hereinafter referred to as a bulk type recording medium 1.

The bulk type recording medium 1 is a disc-shaped optical recording medium, and the bulk type recording medium 1 which is rotatably driven is irradiated with laser light, thereby performing mark recording (information recording). In addition, reproduction of the recorded information is also performed by irradiating the rotatably driven bulk type recording medium 1 with laser light.

The optical recording medium is a generic name of a recording medium performing recording and reproduction of information by light irradiation.

As shown in FIG. 1, the bulk type recording medium 1 is provided with a cover layer 2, a selective reflection layer 3, an intermediate layer 4, and a bulk layer 5 which are sequentially formed from the upper layer side.

Here, in the present specification, the "upper layer side" indicates an upper layer side when a face to which laser light from an optical drive device described later (a recording and reproduction device 10) according to an embodiment is incident is an upper face.

In addition, in the present specification, the term "depth direction" is used and indicates a direction (that is, a direction parallel to an incident direction of laser light from the optical drive device: focus direction) corresponding with the vertical direction according to the definition of the "upper layer side".

In the bulk type recording medium 1, the cover layer 2 is made of resin such as, for example, polycarbonate or acryl, and, as shown in the figure, guide grooves for guiding recording and reproduction positions are formed as position guiders on the lower surface and have concave-convex cross-sectional shapes. The position guiders are formed in a spiral shape or a concentric shape. In this example, the following description is made assuming that the position guiders are formed in a spiral shape.

The guide grooves are formed by continuous grooves or a pit string. For example, if the guide grooves are formed by the pit string, position information (absolute position information: rotation angle information as information indicating a rotation angle position on a disc, radius position information, or the like) is recorded by combinations of lengths of pits and lands. Alternatively, if the guide grooves are formed by grooves, the grooves are formed to be wobbled in a cyclic manner, and thereby position information is recorded using the cycle information of the wobble.

The cover layer 2 is generated by, for example, an injection molding using a stamper on which the guide grooves (concave-convex shape) are formed.

The selective reflection layer 3 is formed on the lower surface side of the cover layer 2 provided with the guide grooves.

Here, as described above, in the bulk recording type, separately from light for performing recording and reproduction of marks (recording and reproduction laser light) for the bulk layer 5 as a recording layer, light for obtaining an error signal of tracking or focus (servo laser light) based on the above-described guide grooves is applied.

At this time, if the servo laser light reaches the bulk layer 5, it may have an adverse effect on the mark recording in the bulk layer 5. For this reason, a reflection layer having selectivity of reflecting the servo laser light and transmitting the recording and reproduction laser light therethrough is used.

Up to now, in the related art, the recording and reproduction laser light and the servo laser light have used laser light having different wavelength bands, and, in order to correspond thereto, the selective reflection layer 3 uses a selective reflection layer having wavelength selectivity of reflecting light having the same wavelength band as the servo laser light and transmitting light other than that therethrough.

The bulk layer 5 as a recording layer is laminated (adhered) under the lower layer side of the selective reflection layer 3 via the intermediate layer 4 made of, for example, an adhesive layer such as a UV cured resin.

A forming material (recording material) of the bulk layer 5 may appropriately use optimal material according to an employed bulk recording type such as, for example, the positive micro hologram type, the negative micro hologram type, or the void recording type.

In addition, a mark recording type of the optical recording medium to which the present disclosure is applied is not particularly limited but may use an arbitrary type in a range of the bulk recording type. In the following description, a case of employing the void recording type will be described as an example.

Here, in the bulk type recording medium 1 having the above-described configuration, the selective reflection layer 3 where the position guiders as the guide grooves are formed becomes a reflection layer which is used as a reference when a position control of the recording and reproduction laser light is performed based on the servo laser light as described later. In this meaning, the face on which the selective reflection layer 3 is formed is also referred to as a reference face Ref. In addition, the "reference face" is also referred to as a "servo signal face".

In addition, hereinafter, the surface (the uppermost face) of the bulk type recording medium 1 is referred to as a surface Sf.

As described with reference to FIG. 12, in the bulk type optical recording medium, the respective layer positions (the information recording layer positions L) for which the information recording is performed are set in advance in order to perform multi-layer recording inside the bulk layer.

Here, the "information recording layer positions" may be expressed as "information recording depths".

Figure 12:
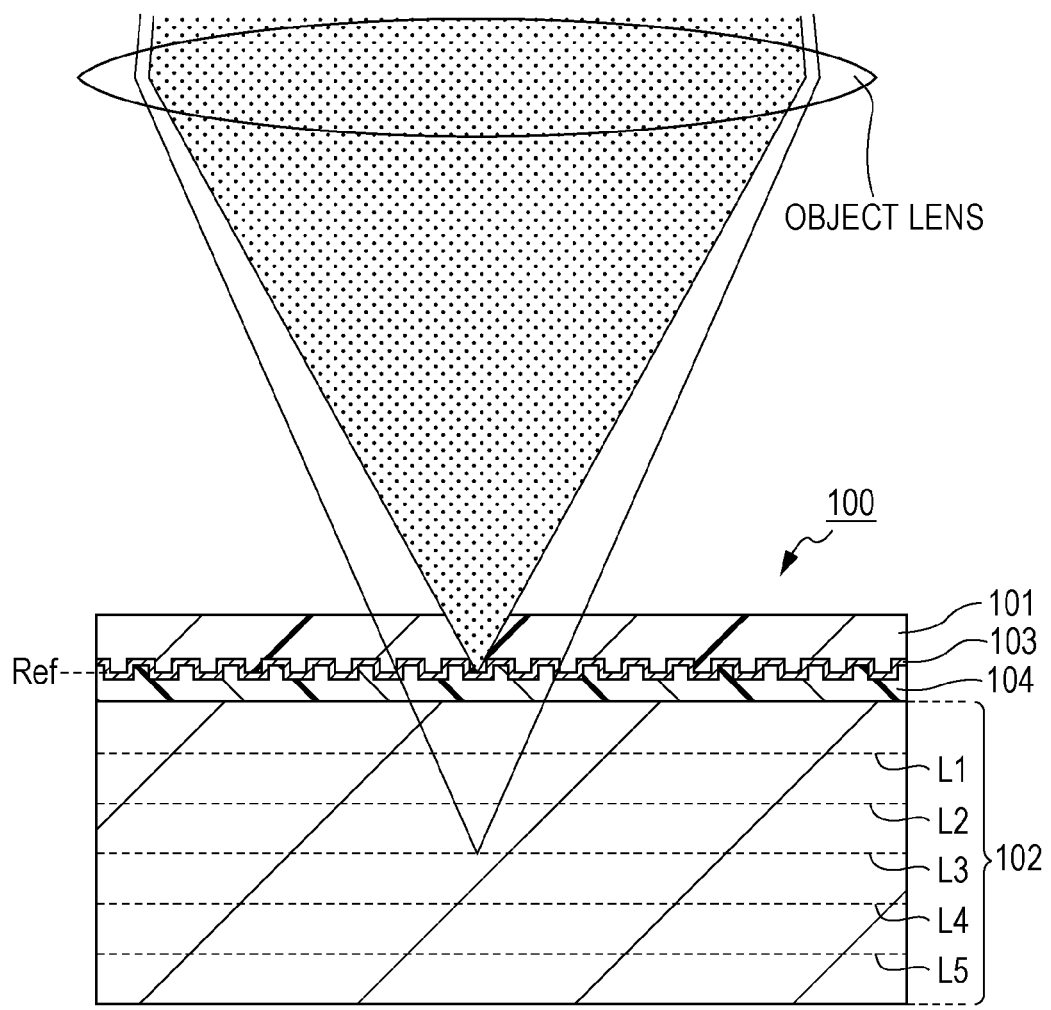
FIG. 12 is a diagram illustrating an operation of recording marks on the bulk type recording medium.

In FIG. 1, in a manner similar to FIG. 12, as the information recording layer positions L, a total of five information recording layer positions, a first information recording layer position L1, a second information recording layer position L2, a third information recording layer position L3, a fourth information recording layer position L4, and a fifth information recording layer position L5 are sequentially set from the upper layer side.

In addition, as described with reference to FIG. 12, the number of the information recording layer positions L is only for convenience of illustration, and, in practice, for example, several tens, such as about twenty to thirty, of the information recording layer positions L may be set.

Here, information indicating each of the information recording layer positions L set inside the bulk layer 5 is set in a controller 39 of the recording and reproduction device 10 described later.

2. Configuration of Optical Drive Device

Figure 2:
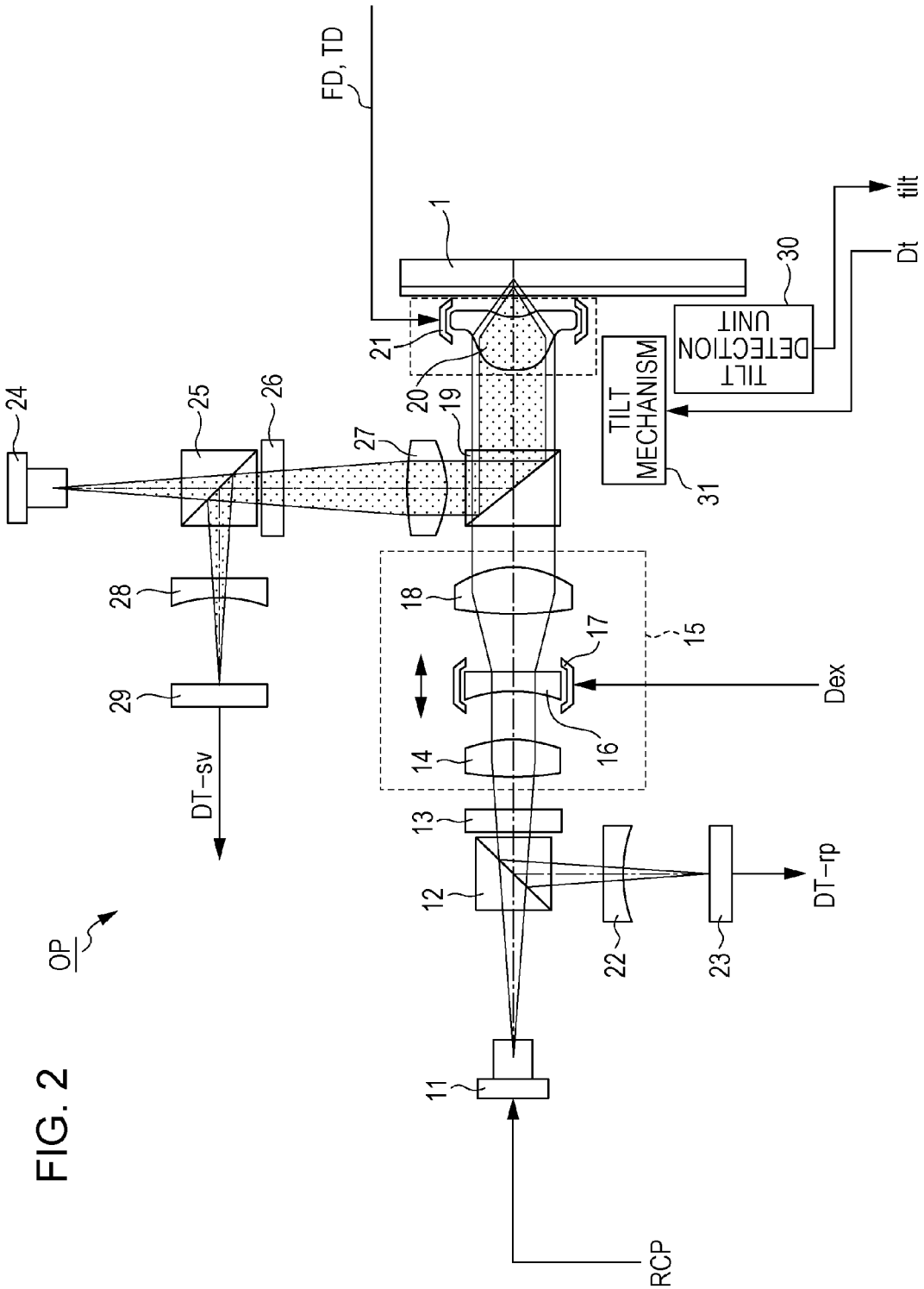
FIG. 2 is a diagram illustrating an internal configuration of an optical pickup included in an optical drive device according to an embodiment.
Figure 3:
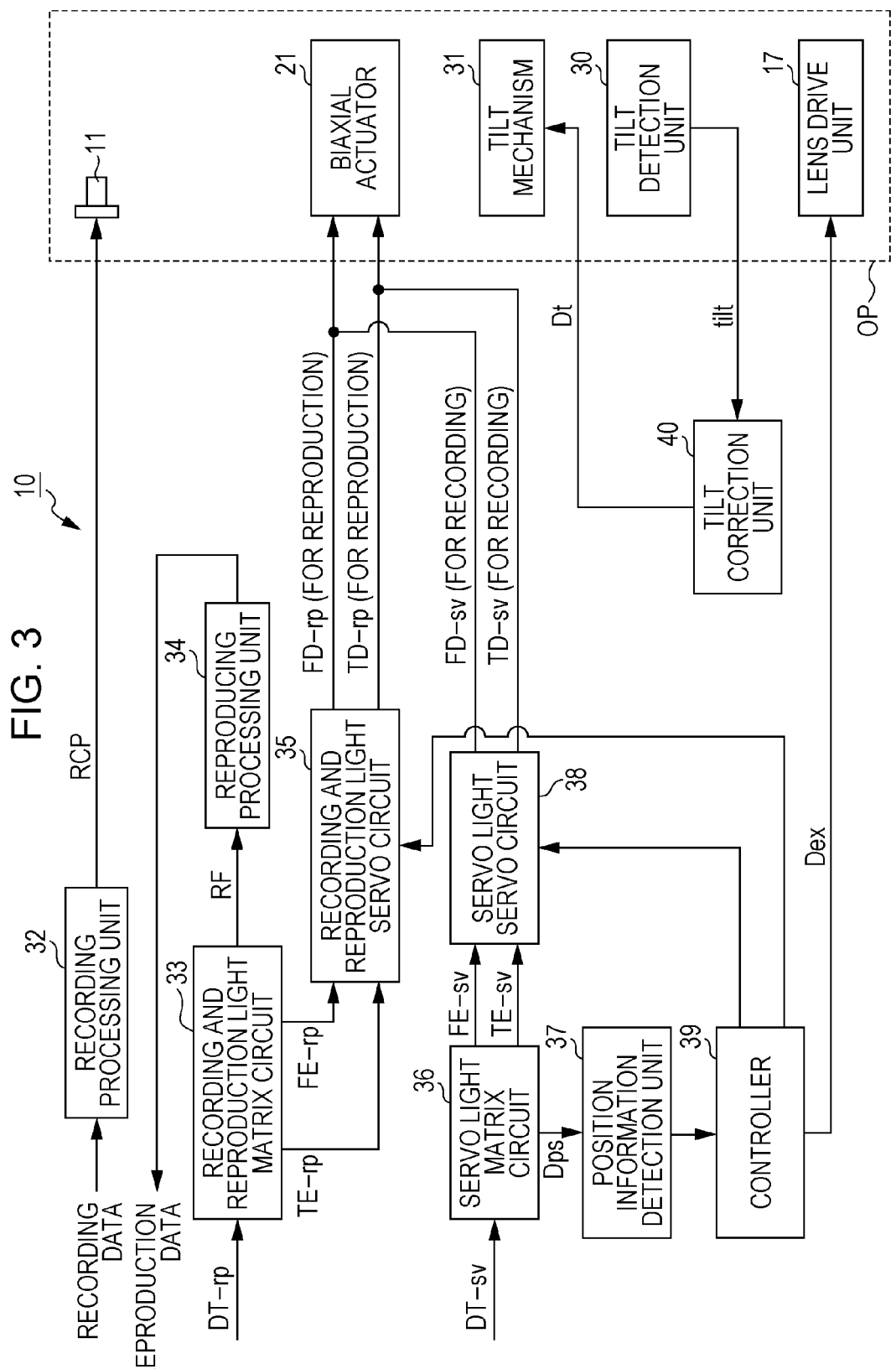
FIG. 3 is a diagram illustrating an overall internal configuration of the optical drive device according to the embodiment.

FIGS. 2 and 3 are diagrams illustrating an internal configuration of the optical drive device (referred to as the recording and reproduction device 10) which performs recording and reproduction for the bulk type recording medium 1 shown in FIG. 1 according to the embodiment.

FIG. 2 mainly shows an internal configuration of an optical pickup OP provided in the recording and reproduction device 10 according to the embodiment, and FIG. 3 shows an overall internal configuration of the recording and reproduction device 10.

2-1. Internal Configuration of Optical Pickup

First, an internal configuration of the optical pickup OP will be described with reference to FIG. 2.

The bulk type recording medium 1 in the figure is set such that the center hole thereof is clamped at a predetermined position in the recording and reproduction device 10, and is held to be rotatably driven by a spindle motor (not shown).

The optical pickup OP is provided to irradiate the bulk type recording medium 1 which is rotatably driven by the spindle motor with recording and reproduction laser light and servo laser light.

In the optical pickup OP, there are provided a recording and reproduction laser 11 which is a light source of recording and reproduction laser light for recording information by marks, and reproducing the information recorded using the marks, and a servo laser 24 which is a light source of servo laser light for performing a position control using the guide grooves formed on the reference face Ref.

Here, as described above, the recording and reproduction laser light and the servo laser light have different wavelengths. In this example, the wavelength of the recording and reproduction laser light is about 405 nm (so-called blue-violet laser light), and the wavelength of the servo laser light is about 650 nm (red laser light).

In addition, in the optical pickup OP, there is provided an objective lens 20 which is an output stage of recording and reproduction laser light and servo laser light to the bulk type recording medium 1.

In addition, there are provided a recording and reproduction light sensing unit 23 for sensing reflection light of the recording and reproduction laser light from the bulk type recording medium 1, and a servo light sensing unit 29 for sensing reflection light of the servo laser light from the bulk type recording medium 1.

Further, in the optical pickup OP, there is an optical system which guides recording and reproduction laser light emitted from the recording and reproduction laser 11 to the objective lens 20 and guides reflection light of the recording and reproduction laser light from the bulk type recording medium 1 to the recording and reproduction light sensing unit 23.

Specifically, the recording and reproduction laser light emitted from the recording and reproduction laser 11 is incident to a polarization beam splitter 12 in a state of divergent light. In this way, the polarization beam splitter 12 is configured to transmit the recording and reproduction laser light incident from the recording and reproduction laser 11 therethrough.

The recording and reproduction laser light passing through the polarization beam splitter 12 is incident to a recording and reproduction light focus mechanism (expander) 15 via a ¼ wavelength plate 13, and a collimation lens 14.

As shown in the figure, the recording and reproduction laser light focus mechanism 15 includes a concave lens 16, a lens driving unit 17, and a convex lens 18.

The recording and reproduction laser light passing through the ¼ wavelength plate 13 is converted into parallel light via the collimation lens 14. In addition, the recording and reproduction laser light passing through the collimation lens 14 is incident to the concave lens 16 inside the recording and reproduction light focus mechanism 15.

In the recording and reproduction light focus mechanism 15, the concave lens 16 is driven by the lens driving unit 17 in a direction parallel to the optical axis of the recording and reproduction laser light, thereby performing an independent focus control for the recording and reproduction laser light.

The lens driving unit 17 is supplied with a driving signal Dex from the controller 39 (FIG. 3) described later. The lens driving unit 17 drives the concave lens 16 based on the driving signal Dex so as to vary collimation of the recording and reproduction laser light incident to the objective lens 20, thereby adjusting a focal position of the recording and reproduction laser light.

In addition, a detailed focus control method (and a spherical aberration correction method) of the recording and reproduction laser light using the recording and reproduction light focus mechanism 15 will be described again later.

The recording and reproduction laser light passing through the recording and reproduction light focus mechanism 15 is incident to a dichroic prism 19.

The dichroic prism 19 has a selective reflection surface which transmits light having the same wavelength as the recording and reproduction light therethrough and reflects light having wavelengths other than that. Therefore, the recording and reproduction laser light incident as described above passes through the dichroic prism 19.

The recording and reproduction laser light passing through the dichroic prism 19 is applied to the bulk type recording medium 1 via the objective lens 20.

The objective lens 20 is provided with a biaxial actuator 21 which holds the objective lens 20 so as to be displaced in the focus direction (direction coming into contact with and separating from the bulk type recording medium 1) and the tracking direction (direction perpendicular to the focus direction: the radius direction of the bulk type recording medium 1).

The biaxial actuator 21 has a focus coil and a tracking coil, which are respectively supplied with driving signals (driving signals FD and TD described later) and displace the objective lens 20 in the focus direction and tracking direction, respectively.

In addition, although the objective lens 20 is shown as one lens (single element lens) in FIG. 2, this is only for convenience of illustration, and, as described later, the objective lens 20 may have a two-group or three-group configuration.

Here, during the reproduction, it is possible to obtain reflection light of the recording and reproduction laser light from the bulk type recording medium 1 (the mark string recorded on the information recording layer positions L which are targets of the reproduction inside the bulk layer 5) in response to the application of the recording and reproduction laser light to the bulk type recording medium 1 as described above. The reflection light of the recording and reproduction laser light obtained in this way is guided to the dichroic prism 19 via the objective lens 20 and then passes through the dichroic prism 19.

The reflection light of the recording and reproduction laser light passing through the dichroic prism 19 is incident to the polarization beam splitter 12 sequentially via the recording and reproduction light focus mechanism 15 (the convex lens 18 and the concave lens 16), the collimation lens 14, and the ¼ wavelength plate 13.

Here, the polarization direction of the reflection light (returning path light) of the recording and reproduction laser light incident to the polarization beam splitter 12 in this way is different by 90 degrees from that of the recording and reproduction laser light (outgoing path light) incident to the polarization beam splitter 12 from the recording and reproduction laser 11 side, due to an operation of the ¼ wavelength plate 13 and the operation at the time of reflection at the bulk type recording medium 1. As a result, the reflection light of the recording and reproduction laser light incident in this way is reflected by the polarization beam splitter 12.

As such, the reflection light of the recording and reproduction laser light reflected by the polarization beam splitter 12 is collected on a light sensing surface of the recording and reproduction light sensing unit 23 via a cylindrical lens 22.

Further, in the optical pickup OP, in addition to the configuration of the optical system for the recording and reproduction laser light described above, there is formation of an optical system which guides servo laser light emitted from the servo laser 24 to the objective lens 20 and guides reflection light of the servo laser light from the bulk type recording medium 1, which has been incident to the objective lens 20, to the servo light sensing unit 29.

As shown in the figure, the servo laser light emitted from the servo laser 24 is incident to a polarization beam splitter 25 in a state of divergent light. The polarization beam splitter 25 is configured to transmit the servo laser light (outgoing path light) incident from the servo laser 24 therethrough as such.

The servo laser light passing through the polarization beam splitter 25 is converted into parallel light by a collimation lens 27 via a ¼ wavelength plate 26, and then is incident to the dichroic prism 19.

As described above, the dichroic prism 19 is configured to transmit light having the same wavelength band as the recording and reproduction laser light therethrough and reflect having wavelengths other than that, and thus the servo laser light is reflected by the dichroic prism 19 and is applied to the bulk type recording medium 1 via the objective lens 20.

Further, reflection light (reflection light from the reference face Ref) of the servo laser light obtained in response to the application of the servo laser light to the bulk type recording medium 1 is reflected by the dichroic prism 19 via the objective lens 20, and is incident to the polarization beam splitter 25 via the collimation lens 27 and the ¼ wavelength plate 26.

In a manner similar to the case of the recording and reproduction laser light, the polarization direction of the reflection light (returning path light) of the servo laser light incident from the bulk type recording medium 1 in this way is different from that the outgoing path light by 90 degrees, due to an operation of the ¼ wavelength plate 26 and the operation at the time of reflection at the bulk type recording medium 1, and, as a result, the reflection light of the servo laser light as the returning path light is reflected by the polarization beam splitter 25.

The reflection light of the servo laser light reflected by the polarization beam splitter 25 is collected on a light sensing surface of the servo light sensing unit 29 via a cylindrical lens 28.

In the optical pickup OP, a tilt detection unit 30 and a tilt mechanism 31 are provided.

The tilt detection unit 30 detects a tilt of the bulk type recording medium 1 (a disc tilt angle).

In this case, the tilt detection unit 30 includes, for example, a light irradiation portion which irradiates the bulk type recording medium 1 with light at a predetermined angle and a light sensing portion which senses reflection light of the light applied by the light irradiation portion from the bulk type recording medium 1, and detects the tilt of the bulk type recording medium 1 by the light sensing portion detecting a misalignment amount of a light sensing position of the reflection light.

A tilt detection signal tilt from the tilt detection unit 30 is supplied to a tilt correction unit 40 described later.

In addition, the tilt mechanism 31 is provided to tilt the objective lens 20 according to the disc tilt. The tilt mechanism 31 in this case holds the biaxial actuator 21 holding the objective lens 20, and tilts the objective lens 20 by tilting the biaxial actuator 21.

The tilt mechanism 31 is driven based on a driving signal Dt from the tilt correction unit 40 shown in FIG. 3.

In addition, hereinafter, the tilt of the objective lens 20 performed by the tilt mechanism 31 is also referred to as a lens tilt.

Here, although description through illustration is omitted, in practice, the recording and reproduction device 10 is provided with a slide driving unit which slidably drives the overall optical pickup OP described above in the tracking direction, and an irradiation position of laser light can be displaced in a wide range through the driving of the optical pickup OP by the slide driving unit.

2-2. Overall Internal Configuration of Optical Drive Device

FIG. 3 shows an overall internal configuration of the recording and reproduction device 10.

In addition, FIG. 3 shows a portion of the internal configuration of the optical pickup OP through extraction. Specifically, the recording and reproduction laser 11, the lens driving unit 17, the biaxial actuator 21, the tilt detection unit 30, and the tilt mechanism 31 are shown.

In FIG. 3, as a configuration of a signal processing system for recording and reproduction targeting the bulk layer 5, or for performing focus and tracking controls of the objective lens 20 during the mark recording and reproduction, the recording and reproduction device 10 is provided with a recording processing unit 32, a recording and reproduction light matrix circuit 33, a reproduction processing unit 34, a recording and reproduction light servo circuit 35, a servo light matrix circuit 36, a position information detection unit 37, and servo light servo circuit 38.

The recording processing unit 32 receives data to be recorded (recording data) on the bulk type recording medium 1. The recording processing unit 32 performs addition of error correction code to the input recording data or a predetermined recording modulation coding for the recording data, and thereby obtains recording modulation data stream which is actually recorded on the bulk type recording medium 1, for example, a binary data stream of "0" and "1".

The recording processing unit 32 controls emission driving of the recording and reproduction laser 11 in the optical pickup OP, in response to a recording pulse signal RCP based on the recording modulation data stream generated in this way. Thereby, information is recorded on the bulk type recording medium 1.

The recording and reproduction light matrix circuit 33 includes a current-voltage conversion circuit, a matrix operation and amplification circuit, and the like, and generates signals necessary for a matrix operation process in response to a light sensing signal DT-rp (output current) from a plurality of light sensing elements which are the recording and reproducing light sensing unit 23 shown in FIG. 2.

Specifically, the recording and reproduction light matrix circuit 33 generates a radio frequency signal (hereinafter, a reproduction signal RF) corresponding to a reproduction signal (reading signal) for the above-described recording modulation data stream, a focus error signal FE-rp for a focus servo control, and a tracking error signal TE-rp for a tracking servo control.

The reproduction signal RF generated by the recording and reproduction light matrix circuit 33 is supplied to the reproduction processing unit 34.

The focus error signal FE-rp and the tracking error signal TE-rp are supplied to the recording and reproducing light servo circuit 35.

The reproduction processing unit 34 performs a reproduction process for recovering the above-described recording data such as a binarization process, decoding of the recording modulation code, and an error correction process, for the reproduction signal RF, thereby generating reproduction data obtained by reproducing the recording data.

The recording and reproduction light servo circuit 35 generates a focus servo signal FS-rp and a tracking servo signal TS-rp based on the focus error signal FE-rp and the tracking error signal TE-rp supplied from the matrix circuit 33, and realizes a focus servo control and a tracking servo control for the recording and reproduction laser light by driving the focus coil and the tracking coil of the biaxial actuator 21 in response to a focus driving signal FD-rp and a tracking driving signal TD-rp based on the focus servo signal FS-rp and the tracking servo signal TS-rp.

Figure 13:
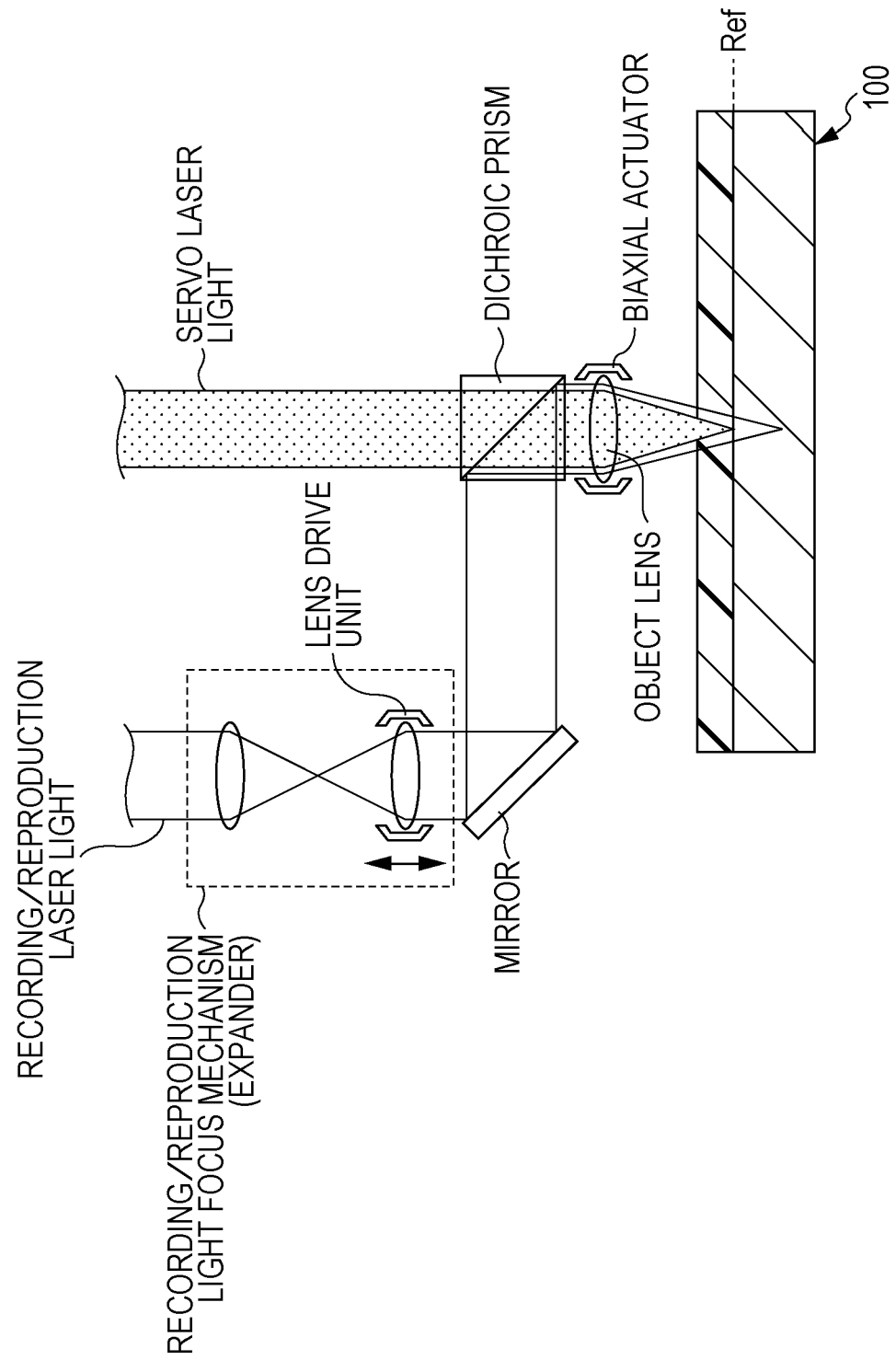
FIG. 13 is a diagram illustrating an outline of an optical system for performing recording and reproduction of the bulk type recording medium.
Figure 14:
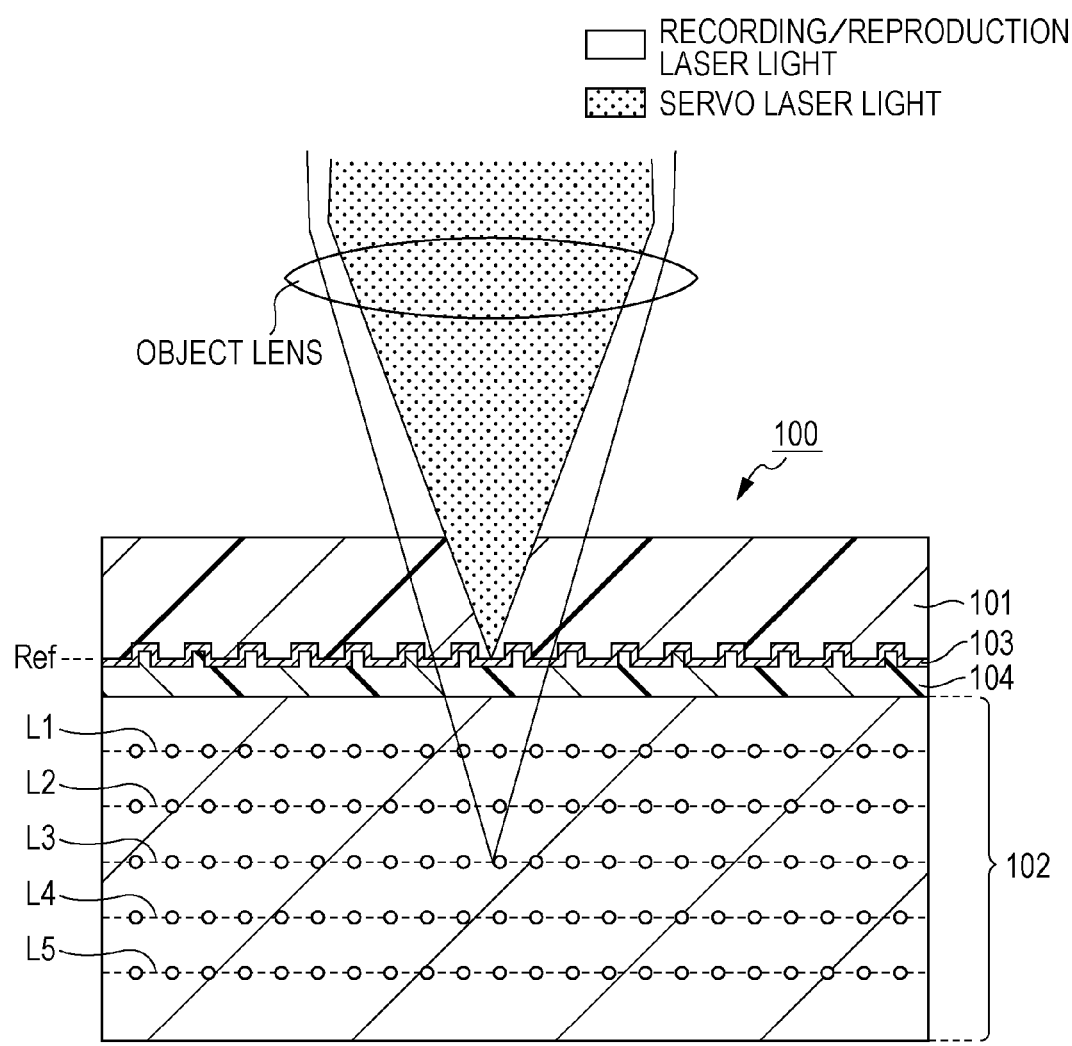
FIG. 14 is a diagram illustrating a servo control during reproduction of the bulk type recording medium.
Figure 15A:
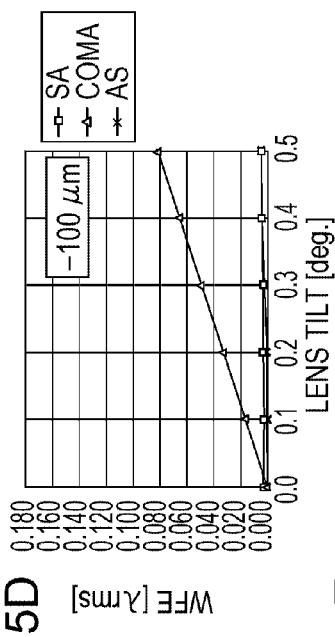
FIGS. 15A to 15F are diagrams illustrating deterioration in an image height characteristic according to an increase in a spherical aberration correction amount.
Figure 15B:
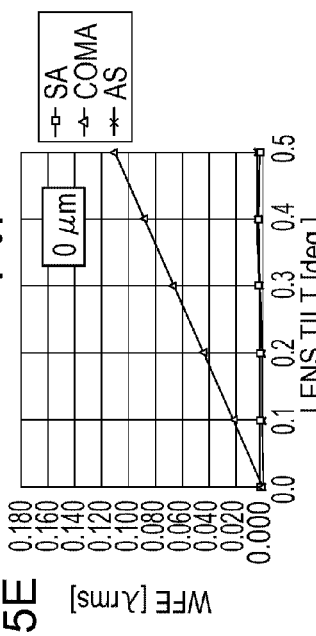
Figure 15C:
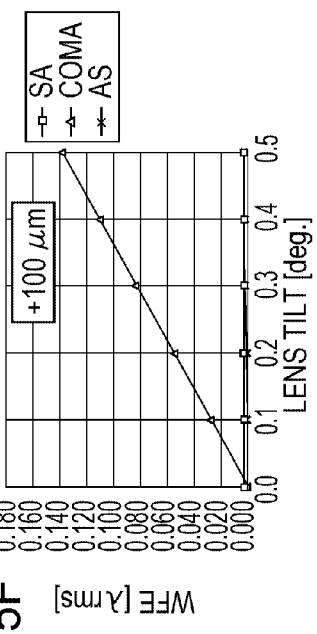
Figure 15D:
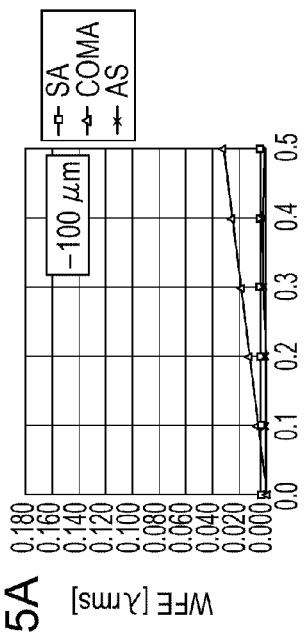
Figure 15E:
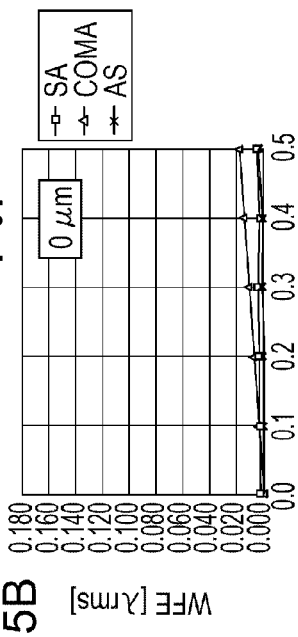
Figure 15F:
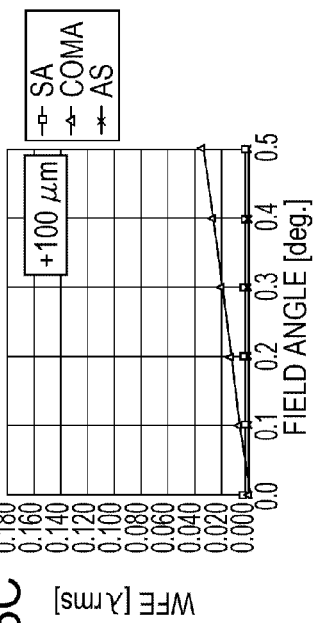

In addition, as can be seen from the description in FIGS. 12 to 14, the servo control of the biaxial actuator 21 (the objective lens 20) based on the reflection light of the recording and reproduction laser light is performed during the reproduction.

Further, in response to an instruction from the controller 39 so as to correspond to the reproduction, the recording and reproduction light servo circuit 35 turns off a tracking servo loop and gives a jump pulse to the tracking coil, thereby realizing a track jumping operation, a pull-in control of the tracking servo, and the like. In addition, a pull-in control of the focus servo or the like is performed.

In addition, in a signal process system for reflection light and servo laser light, the servo light matrix circuit 36 generates necessary signals based on a light sensing signal DT-sv from a plurality of light sensing elements of the servo light sensing unit 29 shown in FIG. 2.

Specifically, the servo light matrix circuit 36 generates a focus error signal FE-sv and a tracking error signal TE-sv for a focus servo control and a tracking servo control, respectively.

In addition, the servo light matrix circuit 36 generates a position information detection signal Dps for detecting the absolute position information (address information) recorded on the reference face Ref. For example, if the absolute position information is recorded by the pit string, a sum signal is generated as the position information detection signal Dps. In addition, if the absolute position information is recorded by the wobbling grooves, a push-pull signal is generated as the position information detection signal Dps.

The position information detection signal Dps is supplied to the position information detection unit 37. The position information detection unit 37 detects the absolute position information recorded on the reference face Ref based on the position information detection signal Dps. The detected absolute position information is supplied to the controller 39.

The focus error signal FE-sv and the tracking error signal TE-sv generated by the servo light matrix circuit 36 are supplied to the servo light servo circuit 38.

The servo light servo circuit 38 generates a focus servo signal FS-sv and a tracking servo signal TS-sv based on the focus error signal FE-sv and the tracking error signal TE-sv.

During the recording, in response to an instruction from the controller 39, the servo light servo circuit 38 drives the focus coil and the tracking coil of the biaxial actuator 21 using a focus driving signal FD-sv and a tracking driving signal TD-sv generated based on the focus servo signal FS-sv and the tracking servo signal TS-sv, thereby realizing a focus servo control and a tracking servo control for the servo laser light.

Further, in response to an instruction from the controller 39 so as to correspond to the recording, the servo light servo circuit 38 turns off the tracking servo loop and gives a jump pulse to the tracking coil, thereby realizing a track jumping operation, a pull-in control of the tracking servo, and the like. In addition, a pull-in control of the focus servo with respect to the reference face Ref or the like is performed.

The controller 39 is constituted by, for example, a microcomputer having a CPU (Central Processing Unit) and a memory (storage device) such as a ROM (Read Only Memory) or a RAM (Random Access Memory), and, for example, controls the overall recording and reproducing device 10 by performing controls and processes according to programs stored in the ROM or the like.

Specifically, the controller 39 controls driving of the lens driving unit 17 of the recording and reproducing light focus mechanism 15 based on the respective information recording layer positions L set in advance as described above, thereby adjusting a focal position of the recording and reproduction laser light.

A detailed method regarding setting of a focal position will be described later.

In addition, the controller 39 also performs a control for realizing servo control switching of the objective lens 20 between the recording and the reproduction as described with reference to FIGS. 12 to 14. Specifically, at the time of the recording, the controller 39 instructs the servo light servo circuit 38 to output the focus driving signal FD-sv and the tracking driving signal TD-sv, and instructs the recording and reproduction light servo circuit 35 to stop output of the focus driving signal FD-rp and the tracking driving signal TD-rp.

On the other hand, at the time of the reproduction, the controller 39 instructs the recording and reproduction light servo circuit 35 to output the focus driving signal FD-rp and the tracking driving signal TD-rp, and instructs the servo light servo circuit 38 to stop output of the focus driving signal FD-sv and the tracking driving signal TD-sv.

In addition, the controller 39 performs a seek operation control for the servo light servo circuit 38. In other words, the controller 39 instructs the servo light servo circuit 38 to move a spot position of the servo laser light to a predetermined address on the reference face Ref.

In this example, the recording and reproducing device 10 is provided with the tilt correction unit 40. The tilt correction unit 40 generates a driving signal for tilting the objective lens 20 by an amount corresponding to a disc tilt, based on the detection signal tilt from the tilt detection unit 30, and drives the tilt mechanism 31 based on the driving signal Dt. Thereby, a tilt correction is realized.

2-3. Adjustment of Focal Position of Recording and Reproduction Laser Light

Figure 4A:
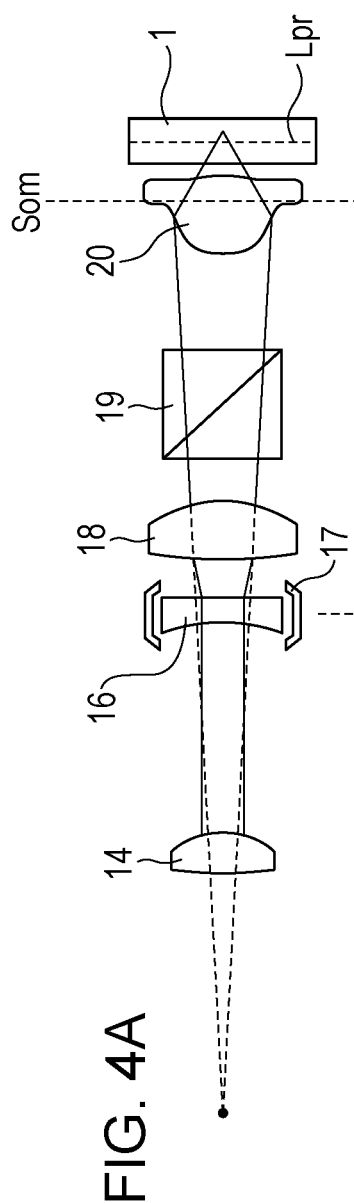
FIGS. 4A to 4C are diagrams illustrating an adjusting method of a focal position using a recording and reproduction light focus mechanism.
Figure 4B:
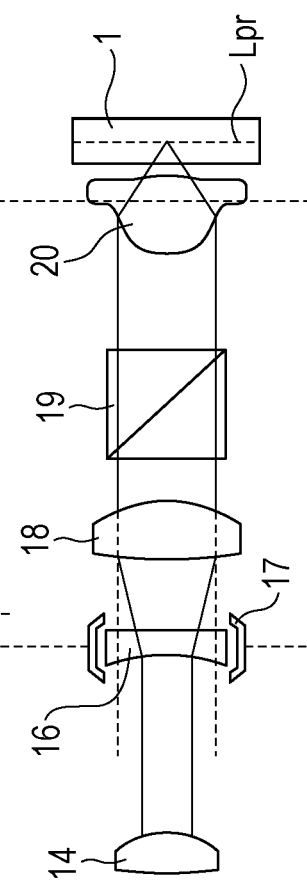
Figure 4C:
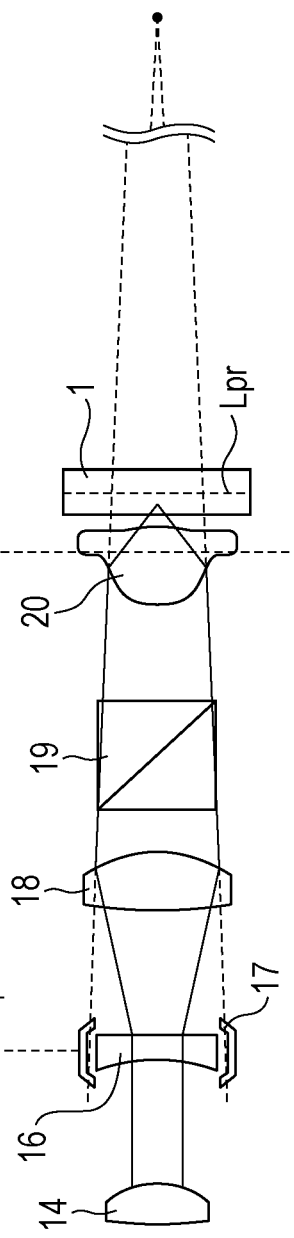

FIGS. 4A to 4C are diagrams illustrating an adjustment method of a focal position using the recording and reproduction light focus mechanism 15.

First, when recording and reproduction are performed for a necessary layer position L of the bulk type recording medium 1, a reference layer position Lpr is set in advance. The reference layer position Lpr is an layer position L which is used as a reference in adjusting a focal position of the recording and reproduction laser light, and, specifically, in this example, it is assumed that the information recording layer position L3 which is in the middle of the information recording layer positions L1 to L5 is set as the reference layer position Lpr.

The recording and reproduction light focus mechanism 15 in this case adjusts a focal position of the recording and reproduction laser light including the spherical aberration correction by using a focusing state on the reference layer position Lpr as a reference.

Specifically, the optical system for the recording and reproduction laser light in this case is designed as shown in FIG. 4B such that a position of the concave lens 16 driven by the lens driving unit 17 comes to the reference position in a state where the recording and reproduction laser light focuses on the reference layer position Lpr. Specifically, in this case, it is assumed that the reference position of the concave lens 16 indicates a level of the driving signal Dex to the lens driving unit 17 is a zero level.

Further, the optical system in this case is designed such that recording and reproduction laser light emitted (that is, incident to the objective lens 20) from the concave lens 16 via the convex lens 18 becomes parallel light as shown in the figures in a state where the concave lens 16 is in the reference position as such.

In addition, the optical system is designed such that the spherical aberration of the recording and reproduction laser light is minimized in a state where the recording and reproduction laser light is incident to the objective lens 20 as the parallel light and focuses on the reference layer position Lpr. In other words, this means that the correction of the spherical aberration is not necessary in the focusing state on the reference layer position Lpr. In this meaning, the reference layer position Lpr is also a reference layer position in the spherical aberration correction.

When recording is performed for the information recording layer positions L positioned at the lower side of the reference layer position Lpr (in this case, the information recording layer position L3) using the state shown in FIG. 4B as a reference, the concave lens 16 is driven toward the objective lens 20 as shown in FIG. 4A (for example, the driving signal Dex with a positive polarity is applied). Thereby, the recording and reproduction laser light incident to the objective lens 20 becomes divergent light, and, as a result, a focal position of the recording and reproduction laser light is adjusted to the lower layer side of the reference layer position Lpr.

At this time, the divergent angle of the recording and reproduction laser light incident to the objective lens 20 increases in proportion to the driving amount of the concave lens 16 from the reference position, and thereby a focal position of the recording and reproduction laser light is adjusted to the lower layer side of the reference layer position Lpr.

On the other hand, when recording is performed for the information recording layer positions L positioned at the upper side of the reference layer position Lpr, the concave lens 16 is driven in a direction (direction of the light source side) separating from the objective lens 20 (for example, the driving signal Dex with a negative polarity is applied), and thereby the recording and reproduction laser light incident to the objective lens 20 is varied. Thereby, it is possible to adjust a focal position of the recording and reproduction laser light to the upper layer side of the reference layer position Lpr. At this time, it is possible to increase the convergent angle of the recording and reproduction laser light incident to the objective lens 20 and to adjust a focal position of the recording and reproduction laser light to a further upper layer side by increasing the driving amount of the concave lens 16 from the reference position.

Based on the premise, the controller 39 shown in FIG. 3 stores information for a level of the driving signal Dex for each of the information recording layer positions L as information indicating each of the information recording layer positions L. Along therewith, the controller 39 stores information for a spherical aberration correction amount according to an error (distance) from the reference layer position Lpr for each of the information recording layer positions L other than the reference layer position Lpr.

As such, the controller 39 controls driving of the lens driving unit 17 according to the information for the level of the driving signal Dex set in advance for each layer position L and the information for the spherical aberration correction amount. Thereby, the recording and reproduction laser light focuses on a position corresponding to the information recording layer position L for which recording is performed, and the spherical aberration correction (defocus) corresponding to the information recording layer position L is performed.

The controller 39 performs the spherical aberration correction using the recording and reproduction light focus mechanism 15 so as to correspond to the reproduction. Specifically, the spherical aberration correction is performed during the reproduction by controlling driving of the lens driving unit 17 based on the information for the spherical aberration correction amount corresponding to an error (distance) from the reference layer position Lpr, stored in advance for each layer position L as described above.

3. Design of Objective Lens 3-1. Detailed Design Guideline

Here, as can be seen from the above description, even the recording and reproducing device 10 according to the embodiment performs the spherical aberration correction and the tilt correction through the lens tilt.

As described above, in a case of employing the configuration, in order to achieve a large recording capacity, the thickness of the bulk layer 5 is increased, and, accordingly, the correction amount is increased in the spherical aberration correction. In this case, the comatic aberration is considerably deteriorated at a correction end side (refer to FIGS. 15A to 15F described above), and, as a result, it is difficult to maintain a stable recording and reproduction performance for all the information recording layer positions L.

Figure 5:
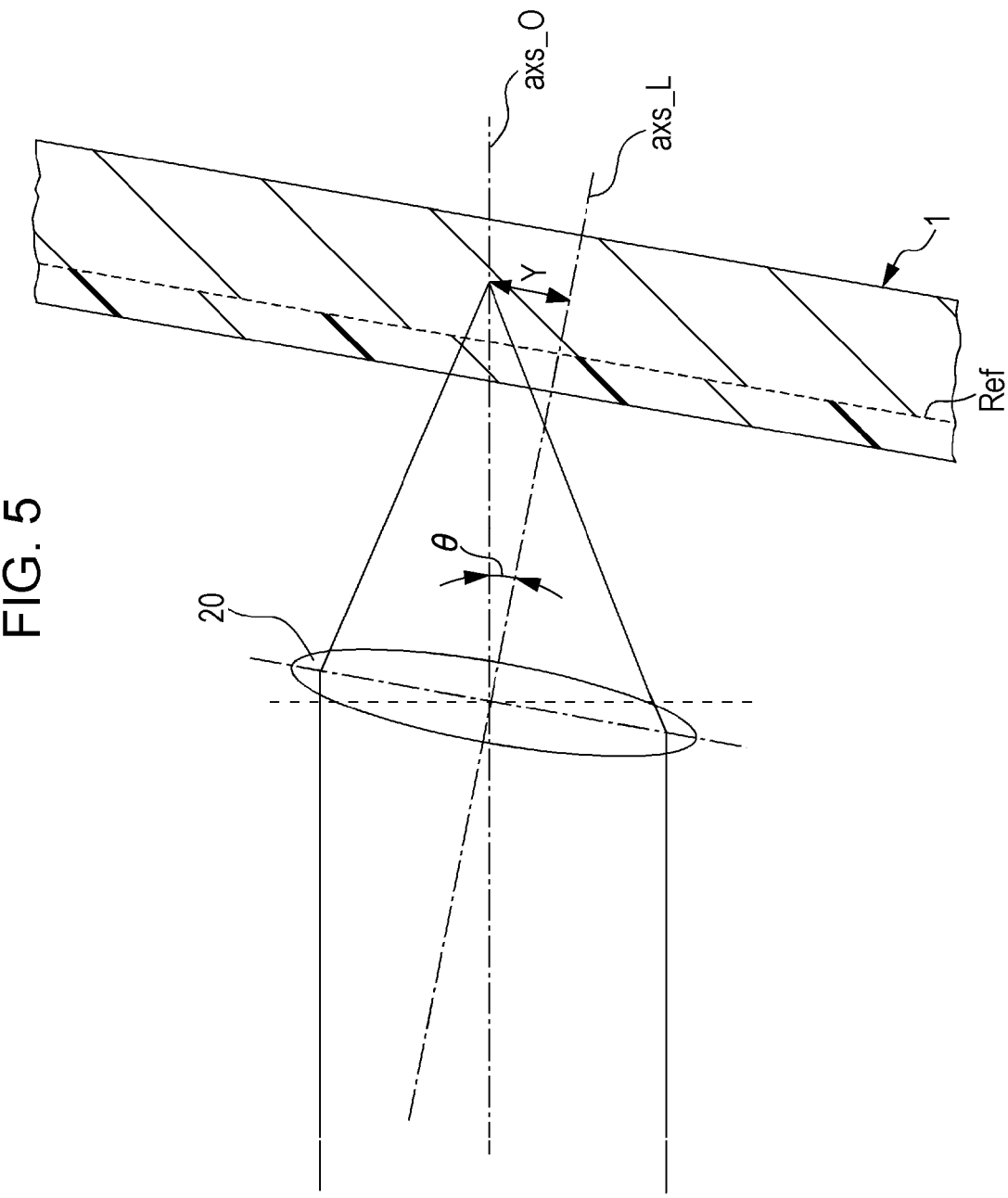
FIG. 5 is a diagram illustrating a relationship between a tilt correction through a lens tilt and image height.

FIG. 5 is a diagram illustrating a relationship between the tilt correction through the lens tilt and the image height.

As shown in FIG. 5, when the tilt correction through the lens tilt is performed by tilting the objective lens 20, the optical axis axis_L of the objective lens 20 is tilted with respect to the optical axis axis_O of the optical system, and thus a focal position of the laser light is misaligned by Y shown in the figure.

Here, Y is called the image height, and when the tilt angle of the optical axis is θ as in the figure, and the focal distance of the objective lens 20 is f, Y is expressed as Y=f×tan θ.

As such, the image height Y is varied by performing the tilt correction through the lens tilt. Therefore, in order to obtain a favorable image forming performance in the recording and reproducing device 10, it can be seen that improvement in the image height characteristic (aberration characteristic for the image height Y) of the objective lens 20 is favorable.

Therefore, in the embodiment, the objective lens 20 is designed as follows.

First, a variation in third-order spherical aberration corresponding to an error between a condensed position and the reference layer position Lpr during the recording (reproduction) (hereinafter, referred to as a third-order spherical aberration variation) $W_{40}$ is represented as follows.

$$W_{40}=dt/8\times(n^2-1)/n^3\times NA^4 \quad \text{[Equation 1]}$$

In terms of λrms unit, it gives $W_{40}\times\{1/6/\mathrm{sqrt}(5)/\lambda\}$ [Equation 2].

In addition, a variation in the third-order comatic aberration corresponding to an error between the condensed position and the reference layer position Lpr (referred to as a third-order comatic aberration variation) $W_{31}$ is represented as follows.

$$W_{31}=dt/2\times(n^2-1)\times n^2\times\sin\theta\times\cos\theta/(n^2-\sin^2\theta)^{5/2}\times NA^3 \quad \text{[Equation 3]}$$

In terms of λrms unit, it gives $$W_{31}\times\{1/2/3/\mathrm{sqrt}(2)\} \quad \text{[Equation 4]}.$$

Here, in Equations 1 to 4, dt is an error between the condensed position and the reference layer position Lpr, n is a refractive index of the bulk type recording medium 1, NA is an effective numerical aperture of the objective lens 20, θ is a disc tilt angle (radian), and λ is a wavelength of recording and reproduction laser light.

Here, in a condition where the tilt correction is not performed, a relationship between the third-order spherical aberration variation and the third-order comatic aberration variation may be expressed as the third-order comatic aberration variation=α*third-order spherical aberration variation.

On the other hand, a condition for performing the tilt correction (comatic aberration correction) by tilting the objective lens 20 at the same angle as the disc tilt angle θ corresponds to a condition obtained by dividing Equation 4 by the lens tilt angle and further reversing the polarity of Equation 4. In other words, the condition is (−1)×third-order comatic aberration variation/lens tilt angle.

Therefore, a relationship between the third-order spherical aberration variation and the third-order comatic aberration variation in a case where the tilt correction is performed may be expressed as (−1)×third-order spherical aberration variation/lens tilt angle=α*third-order spherical aberration variation [Equation 5].

If rewritten, it becomes (−1)×Equation 4/θ=α×Equation 2 [Equation 5].

Here, in the above Equation 5, if the disc tilt angle θ is assumed to be in a sufficiently small range (±0.5°), and sin θ≅θ and cos θ≅1, it gives $$\alpha=-6.32\times n^5/NA/(n^2-\theta^2)^{5/2} \quad \text{[Equation 6]}.$$

At this time, if n>>θ, it gives $(n^2-\theta^2)=n^2$.

Therefore, the above Equation 6 becomes $$\alpha=-6.32/NA \quad \text{[Equation 7]}.$$

A value of α obtained by Equation 7 has nothing to do with the difference dt in the cover thicknesses, the refractive index n of the recording medium, and the wavelength λ of the laser light, and becomes an ideal value (intermediate value) of α.

In this example, NA of the objective lens 20 is about 0.85, and thus an ideal value of α in this example is $$\alpha\cong-7.44 \quad \text{[Equation 8]}.$$

Here, in this example, the refractive index of the recording medium is n=1.6, and the maximum tilt angle (the maximum value of θ) is 0.5° (±0.5°).

At this time, for example, if the thickness of the bulk layer 5 is about 300 μm, and the maximum value of the error dt from the reference layer position Lpr is about ±150 μm, the third-order spherical aberration variation $W_{40}$ in this case becomes about ±0.68 λrms from the above Equation 2. Therefore, when the same error dt is the maximum and the maximum tilt angle is 0.5°, the third-order comatic aberration variation $W_{31}$ (λrms) becomes about 0.0445 λrms by Equation 5 from the above 0.68 λrms and the ideal value of α in Equation 8.

In the embodiment, a range of a value of α is set such that a value of the third-order spherical aberration variation at α=ideal value in the condition that the error dt from the reference layer position Lpr is the maximum and the tilt angle θ is the maximum can be included in an allowable difference range based on the Marechal criterion.

As an example, when the allowable difference range is set to the Marechal criterion (=0.07 λrms) itself, a ratio of the allowable difference is about 157% (0.07/0.0445) from the third-order comatic aberration variation≅0.0445 λrms. Therefore, the accuracy which is allowable for α is 157% (α×2.57<α<α/2.57), and it gives $$-19.1<\alpha<-2.9 \quad \text{[Equation 9]}.$$

That is to say, in this case, the objective lens 20 is preferably designed such that α at third-order comatic aberration variation/lens tilt angle=α*third-order spherical aberration variation has a value in the allowable difference range in Equation 9.

In addition, assuming that a sufficient margin is given in consideration of aberrations of other optical components, and if the allowable difference range is set to a half value=0.035 λrms of the Marechal criterion, a ratio of the allowable difference from the third-order comatic aberration variation≅0.0445 λrms is about 80%, and thus the accuracy allowable for α is 80% (α×1.8<α<α/1.8). This resultantly gives $$-13.4<\alpha<-4.1 \quad \text{[Equation 10]}.$$

Therefore, in this case, the objective lens 20 is preferably designed that α at third-order comatic aberration variation/lens tilt angle=α*third-order spherical aberration variation has a value in the allowable difference range in Equation 10.

As described above, in the embodiment, the objective lens 20 is designed such that a value of α at "third-order comatic aberration variation/lens tilt angle=α*third-order spherical aberration variation" has a value in the allowable difference range using an ideal value of corresponding α as a reference and has a value in the allowable difference range which is set the third-order comatic aberration variation and the Marechal criterion when an error between the reference layer position Lpr and the condensed position of the laser light is the maximum and the tilt angle θ is the maximum.

Thereby, even in a worst condition that a condensed position of the recording and reproduction laser light is the farthest from the reference layer position Lpr and the tilt is the maximum, it is possible to maintain a high performance based on the Marechal criterion as an image forming performance of the recording and reproduction laser light.

Thereby, it is possible to improve a recording and reproduction performance in the drive device of the bulk type recording medium 1 performing the spherical aberration correction and the tilt correction through the lens tilt.

In addition, according to the embodiment, it is possible to treat a further increase in the thickness of the bulk layer 5 according to the improvement in the image height characteristic of the objective lens 20, and to achieve a novel large recording capacity.

Figure 6:
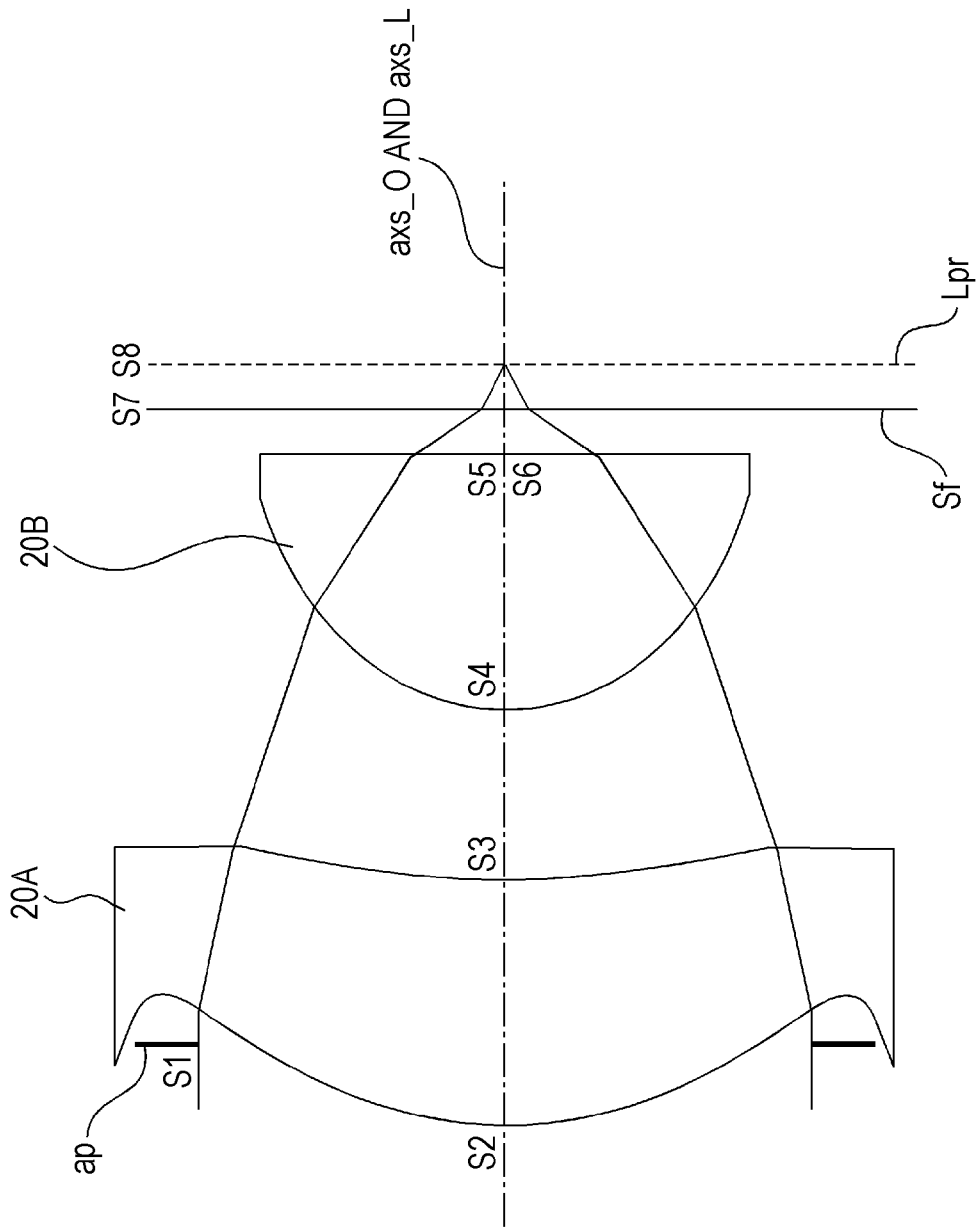
FIG. 6 is a cross-sectional view illustrating a configuration of an objective lens according to Embodiment 1.

In addition, FIG. 6 shows the surface Sf and the reference layer position Lpr together.

FIG. 6 shows a light beam of recording and reproduction laser light applied to the bulk type recording medium 1 via the objective lens 20.

Further, the optical axis axis_O of the optical system and the optical axis axis_L of the objective lens 20 are shown.

As shown in the figure, the objective lens 20 in this case has a two-group configuration including a rear lens 20A and a front lens 20B. An aperture ap is provided on the face of the emission point side (light source side) of the rear lens 20A, and narrows down the diameter of incident light to a predetermined diameter.

FIG. 6 shows that recording and reproduction laser light is incident to the rear lens 20A as parallel light and thereby the recording and reproduction laser light focuses on the reference layer position Lpr.

The following Table 1 shows a design example of the objective lens 20 according to Embodiment 1.

TABLE 1

| [face data] | | | |
|---|---|---|---|
| face number | curvature radius [mm] | face distance [mm] | refractive index |
| S0 (emission point) | INFINITY | INFINITY | |
| S1 (aperture face) | INFINITY | −0.35 | |
| S2 | 1.73757 | 1 | 1.6 |
| S3 | 3.50863 | 0.7 | |
| S4 | 0.81397 | 1.05 | 1.6 |
| S5 | INFINITY | 0 | |
| S6 | INFINITY | 0.17 | |
| S7 | INFINITY | 0.175 | 1.6 |
| S8 | INFINITY | 0 | |

| [asphericity] | | | | | | | | |
|---|---|---|---|---|---|---|---|---|
| face number | | | | | | | | |
| S2 | K | −5.872270.E−01 | | | | | | |
|  | A | 1.051210.E−02 | B | −1.88100E−04 | C | −3.87923E−03 | D | 2.78653E−03 |
|  | E | −2.941320.E−03 | F | 1.30916E−03 | G | −5.23026E−04 | H | 0.00000E+00 |
|  | J | 0.000000.E+00 | | | | | | |
| S3 | K | −4.288553.E+00 | | | | | | |
|  | A | 9.499610.E−03 | B | −1.46405E−02 | C | 1.77722E−03 | D | −4.95510E−03 |
|  | E | −1.673790.E−03 | F | −1.35941E−03 | G | 1.51475E−03 | H | 0.00000E+00 |
|  | J | 0.000000.E+00 | | | | | | |
| S4 | K | −3.725030.E−01 | | | | | | |
|  | A | −3.576850.E−05 | B | −2.95331E−02 | C | 2.12887E−02 | D | 6.66071E−03 |
|  | E | −1.705430.E−01 | F | 5.47161E−02 | G | −4.12004E−10 | H | 0.00000E+00 |
|  | J | 0.000000.E+00 | | | | | | |

| [position data] | | | |
|---|---|---|---|
| face number | position 1 [mm] | position 2 [mm] | position 3 [mm] |
| S0 (emission point) | −36.01172 | INFINITY | 39.04089 |
| S6 | 0.18863 | 0.17 | 0.14748 |
| S7 | 0.05 | 0.175 | 0.3 |

3-2. Embodiment 1: Design Example of Two-Group Configuration

Hereinafter, a detailed design example of the objective lens 20 satisfying the conditions of α in both Equations 9 and 10 will be described.

First, a design example (referred to as Embodiment 1) in a case of employing a two-group configuration will be described with reference to FIG. 6.

FIG. 6 is a cross-sectional view illustrating a configuration of the objective lens 20 according to Embodiment 1.

Here, in this example, the refractive index of the bulk type recording medium 1 is n=1.6; the wavelength of the recording and reproduction laser light is λ=405 nm; the beam diameter incident to the objective lens 20 is 2.5 mm; and the focal distance is 1.47 mm.

In the above Table 1, the face numbers S1 to S8 correspond to the face numbers S1 to S8 shown in FIG. 6. Here, the face number S0 denotes an emission point of the recording and reproduction laser light.

In addition, both the face numbers S5 and S6 denote faces of the bulk type recording medium 1 side of the front lens 20B.

In addition, the face number S8 denotes a face of the information recording layer position L as a condensed position, and when the recording and reproduction laser light is incident to the objective lens 20 as parallel light, a face of the face number S8 matches the reference layer position Lpr as shown in FIG. 6.

Further, in Table 1, the value (0.17 mm) of a face distance correlated with the face number S6 denotes a face distance between S6 and S7, that is, the thickness of air between the end face of the objective lens 20 and the surface Sf of the bulk type recording medium 1.

In addition, in Table, A to H and J denote asphericity, and K denotes a conic factor.

Here, the asphericity is defined by the following Equation 11.

$$Z = \frac{ch^2}{1 + SQRT\{1 - (1+k)c^2h^2\}} + Ah^4 + Bh^6 + Ch^8 + Dh^{10} + Eh^{12} + Fh^{14} + Gh^{16} + Hh^{18} + Jh^{20}$$

[Equation 11]

In Equation 11, z denotes sag of a parallel plane with respect to the z axis (axis parallel to the optical axis), c denotes a curvature (CUY) at the face vertex, and k denotes a conic factor (K). Further, h denotes the height from the optical axis (a distance from the optical axis in the direction perpendicular to the optical axis).

In addition, in Table 1, the "position data" denotes a design solution determined by optimizing three matters, such as 1) dependence on the depth of a condensed position (an error between the condensed position and the reference layer position Lpr), 2) movement of the position (S0) of the emission point, and 3) movement at the distance between the bulk type recording medium 1 and the objective lens 20.

In the "position data" in Table 1, the respective values correlated with the face number S7 denote face distances between S7 and S8 (a distance between the surface Sf and the condensed position). In addition, the respective values correlated with the face number S6 denote face distances between S6 and S7 (a distance between the end face of the objective lens 20 and the surface Sf).

In addition, in the values of the respective positions of the emission point, "INFINITY" indicates that the recording and reproduction laser light is incident to the objective lens 20 as parallel light. The positive sign of the value of the position of the emission point indicates that the recording and reproduction laser light is incident to the objective lens 20 as divergent light (FIG. 4A), and the negative sign indicates that the recording and reproduction laser light is incident as convergent light (FIG. 4C).

Figure 7:
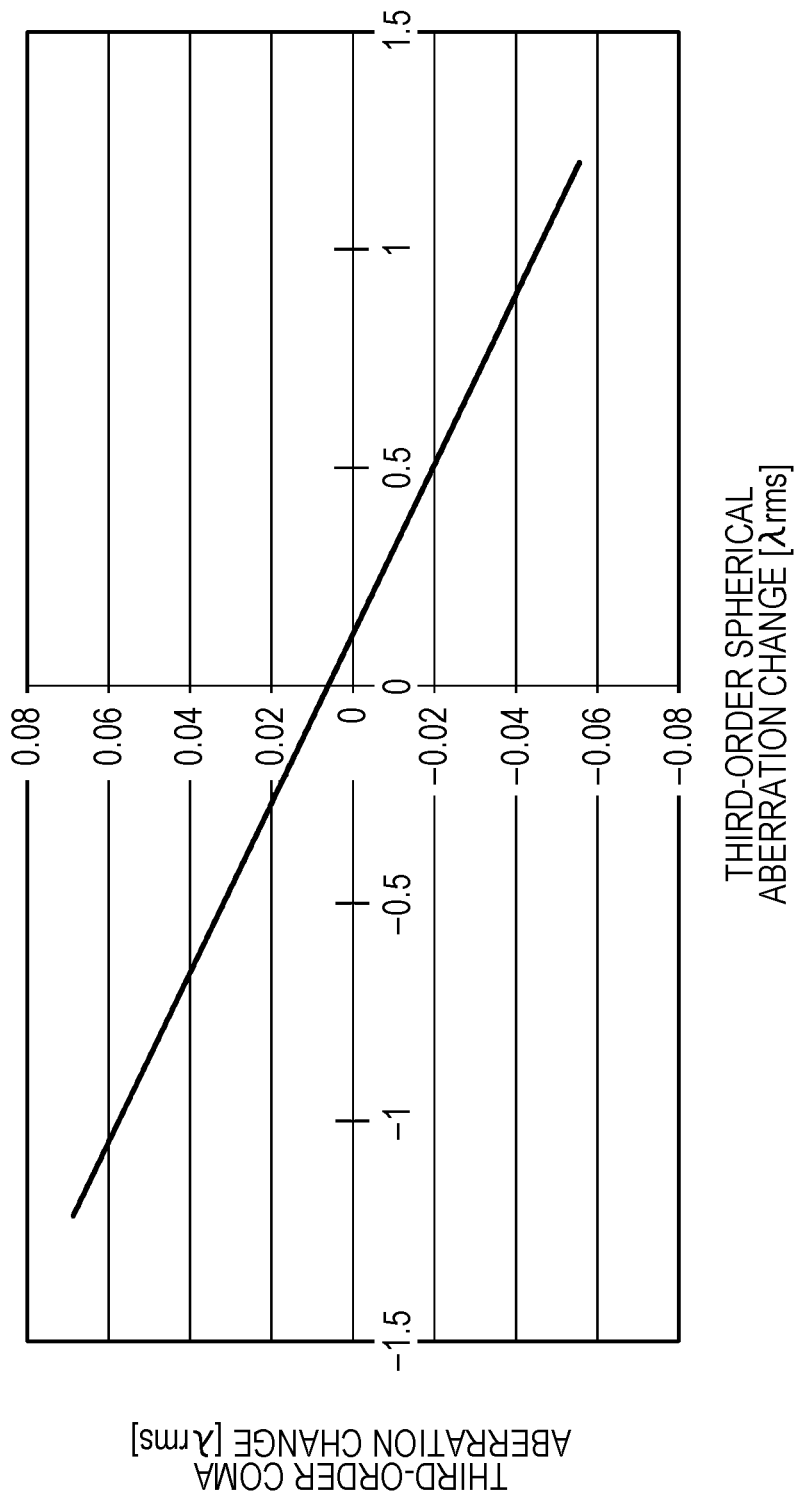
FIG. 7 is a diagram illustrating a relationship between a third-order spherical aberration variation and a third-order comatic aberration variation in the objective lens according to Embodiment 1.

FIG. 7 is a diagram illustrating a relationship between the third-order spherical aberration variation (λrms) and the third-order comatic aberration variation (λrms) in the objective lens 20 according to Embodiment 1, designed based on Table 1.

As in FIG. 7, when the transverse axis (x axis) expresses the third-order spherical aberration variation and the longitudinal axis (y axis) expresses the third-order comatic aberration variation, a relational expression between the two variations in the objective lens 20 according to Embodiment 1 becomes y=0.0509x+0.0061.

Here, a value of α corresponds to a value obtained by dividing a tilt value in the relational expression between the third-order spherical aberration variation and the third-order comatic aberration variation (corresponding to "third-order spherical aberration variation=a*third-order comatic aberration variation") by a lens tilt angle (radian).

Therefore, a value of α of the objective lens 20 according to Embodiment 1 is α=−0.0509÷0.00873(=0.5°)=−5.83.

It can be seen from the result that the objective lens 20 according to Embodiment 1 satisfies both the conditions in the above Equations 9 and 10.

3-3. Embodiment 2: Design Example of Three-Group Configuration

Next, Embodiment 2 corresponds to a design example in a case where the objective lens 20 has a three-group configuration.

Figure 8:
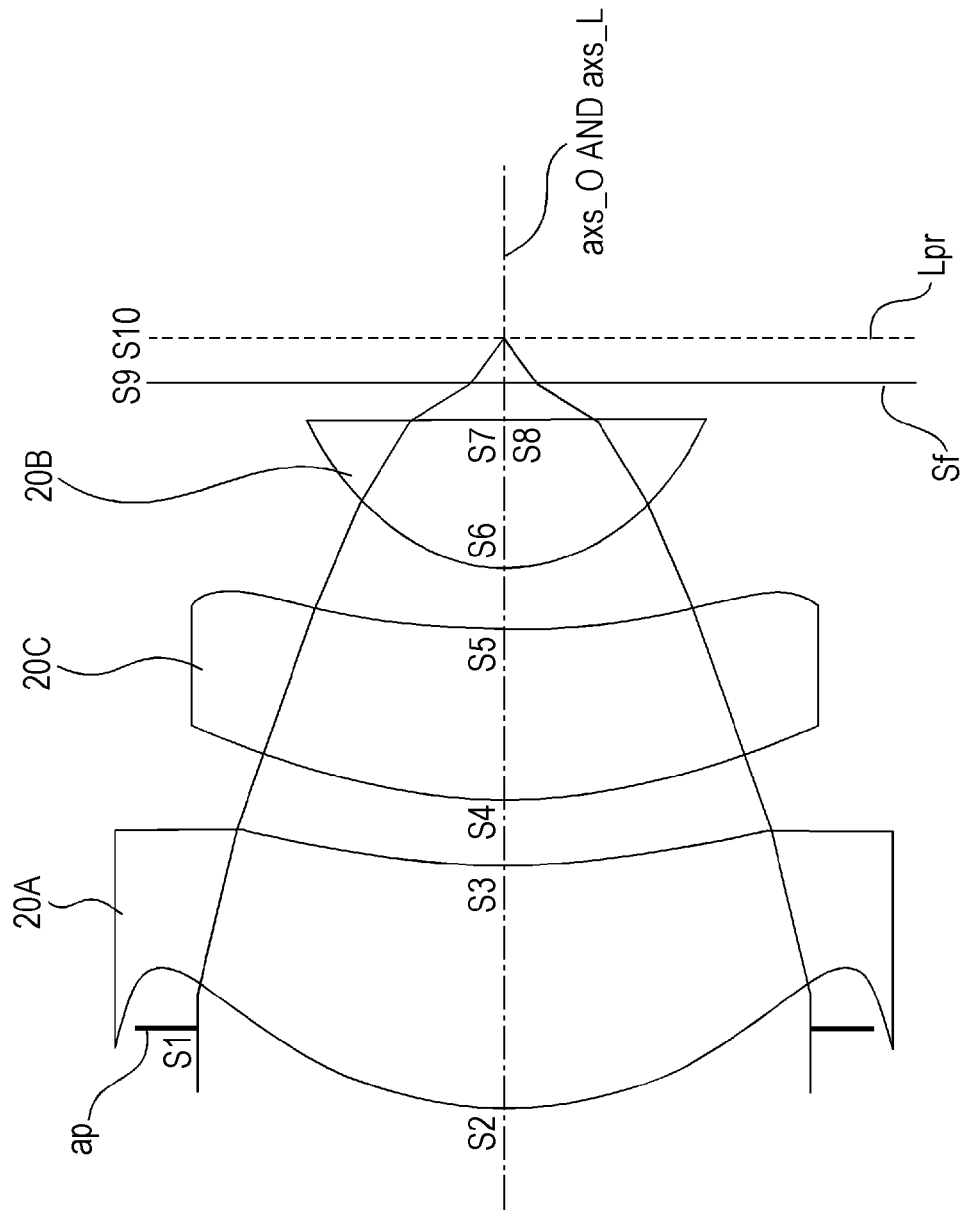
FIG. 8 is a cross-sectional view illustrating a configuration of an objective lens according to Embodiment 2.

FIG. 8 is a cross-sectional view illustrating a configuration of the objective lens 20 according to Embodiment 2.

In addition, in a manner similar to FIG. 6, FIG. 8 shows the surface Sf and the reference layer position Lpr of the bulk type recording medium 1, a light beam of recording and reproduction laser light applied to the bulk type recording medium 1 via the objective lens 20, and the optical axis axis_O of the optical system and the optical axis axis_L of the objective lens 20 together.

As shown in the figure, the objective lens 20 in this case has a three-group configuration including a rear lens 20A, a front lens 20B, and an intermediate lens 20C interposed therebetween. In this case as well, an aperture ap is provided on the face of the emission point side (light source side) of the rear lens 20A.

In a manner similar to FIG. 6, FIG. 8 shows that recording and reproduction laser light is incident to the rear lens 20A as parallel light and thereby the recording and reproduction laser light focuses on the reference layer position Lpr.

The following Table 2 shows a design example of the objective lens 20.

TABLE 2

| [face data] | | | |
|---|---|---|---|
| face number | curvature radius [mm] | face distance [mm] | refractive index |
| S0 (emission point) | INFINITY | INFINITY | |
| S1 (aperture face) | INFINITY | −0.45 | |
| S2 | 1.60274 | 1 | 1.6 |
| S3 | 3.43846 | 0.277328 | |
| S4 | 2.62334 | 0.7 | 1.6 |
| S5 | 3.4837 | 0.254132 | |
| S6 | 0.72202 | 0.6 | 1.6 |
| S7 | INFINITY | 0 | |
| S8 | INFINITY | 0.17 | |

TABLE 2-continued

| | | | |
|---|---|---|---|
| S9 | INFINITY | 0.175 | 1.6 |
| S10 | INFINITY | 0 | |

[asphericity]

| face number | | | | | | | | |
|---|---|---|---|---|---|---|---|---|
| S2 | K | −6.393790.E−01 | | | | | | |
| | A | 8.345480.E−03 | B | −1.65317E−04 | C | −3.36873E−03 | D | 2.65392E−03 |
| | E | −2.933160.E−03 | F | 1.31833E−03 | G | −5.23474E−04 | H | 0.00000E+00 |
| | J | 0.000000.E+00 | | | | | | |
| S3 | K | −2.918043.E+00 | | | | | | |
| | A | 1.193120.E−02 | B | −1.39017E−02 | C | 1.78606E−03 | D | −5.67222E−03 |
| | E | −1.531790.E−03 | F | −1.28045E−03 | G | 1.47025E−03 | H | 0.00000E+00 |
| | J | 0.000000.E+00 | | | | | | |
| S4 | K | −2.527850.E−01 | | | | | | |
| | A | −1.391080.E−03 | B | −6.91167E−04 | C | −1.28188E−03 | D | −1.86042E−03 |
| | E | −1.864010.E−04 | F | −1.47361E−04 | G | 5.14214E−04 | H | 0.00000E+00 |
| | J | 0.000000.E+00 | | | | | | |
| S5 | K | 5.252200.E−02 | | | | | | |
| | A | −3.602680.E−04 | B | 1.66532E−03 | C | 3.39811E−03 | D | −9.53963E−03 |
| | E | −2.989680.E−03 | F | −5.49835E−12 | G | −3.59213E−12 | | 0.00000E+00 |
| | J | 0.000000.E+00 | | | | | | |
| S6 | K | −3.552640.E−01 | | | | | | |
| | A | 1.690540.E−02 | B | −6.86173E−02 | C | 4.99565E−02 | D | −4.18440E−01 |
| | E | −1.705430.E−01 | F | 5.47161E−02 | G | −4.12000E−10 | H | 0.00000E+00 |
| | J | 0.000000.E+00 | | | | | | |

[position data]

| face number | position 1 [mm] | position 2 [mm] | position 3 [mm] |
|---|---|---|---|
| S0 (emission point) | −35.90838 | INFINITY | 37.21794 |
| S8 | 0.18802 | 0.17 | 0.14993 |
| S9 | 0.05 | 0.175 | 0.3 |

In this case as well, in a manner similar to Embodiment 1, the refractive index of the bulk type recording medium 1 is n=1.6; the wavelength of the recording and reproduction laser light is λ=405 nm; the beam diameter incident to the objective lens 20 is 2.5 mm; and the focal distance is 1.47 mm.

The face numbers S1 to S10 correspond to the face numbers S1 to S10 shown in FIG. 8, and in this case as well, the face number S0 denotes an emission point of the recording and reproduction laser light.

In this case, both the face numbers S7 and S8 denote faces of the bulk type recording medium 1 side of the front lens 20B. In addition, the face number S10 denotes a face of the information recording layer position L as a condensed position, and when the recording and reproduction laser light is incident to the objective lens 20 as parallel light, a face of the face number S10 matches the reference layer position Lpr as shown in FIG. 8.

Further, in Table 2, the value (0.17 mm) of a face distance correlated with the face number S8 denotes the thickness of air between the end face of the objective lens 20 and the surface Sf of the bulk type recording medium 1.

Here, the remaining parts are the same as the case of the above Table 1.

Figure 9:
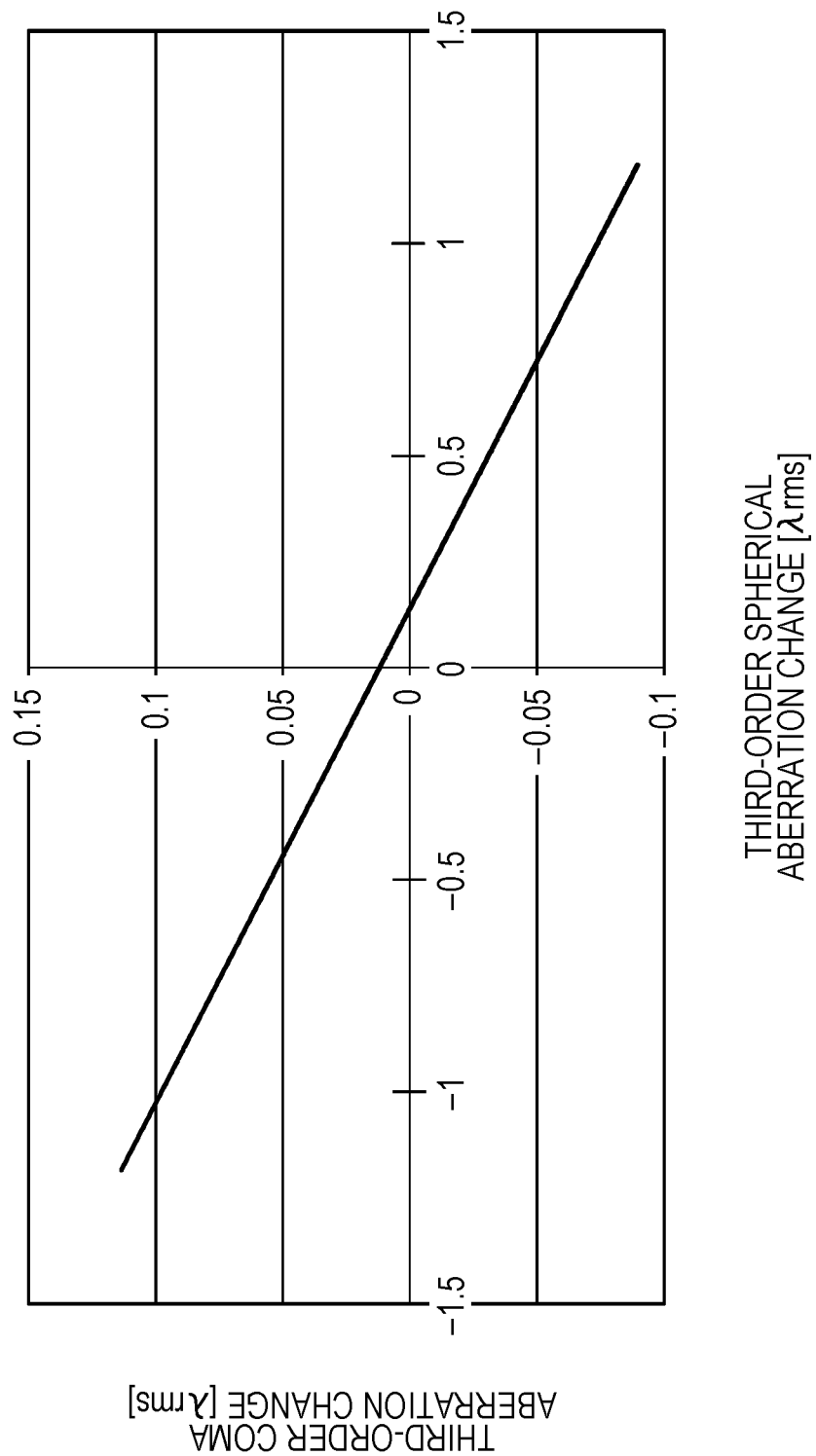
FIG. 9 is a diagram illustrating a relationship between a third-order spherical aberration variation and a third-order comatic aberration variation in the objective lens according to Embodiment 2.
Figure 10:
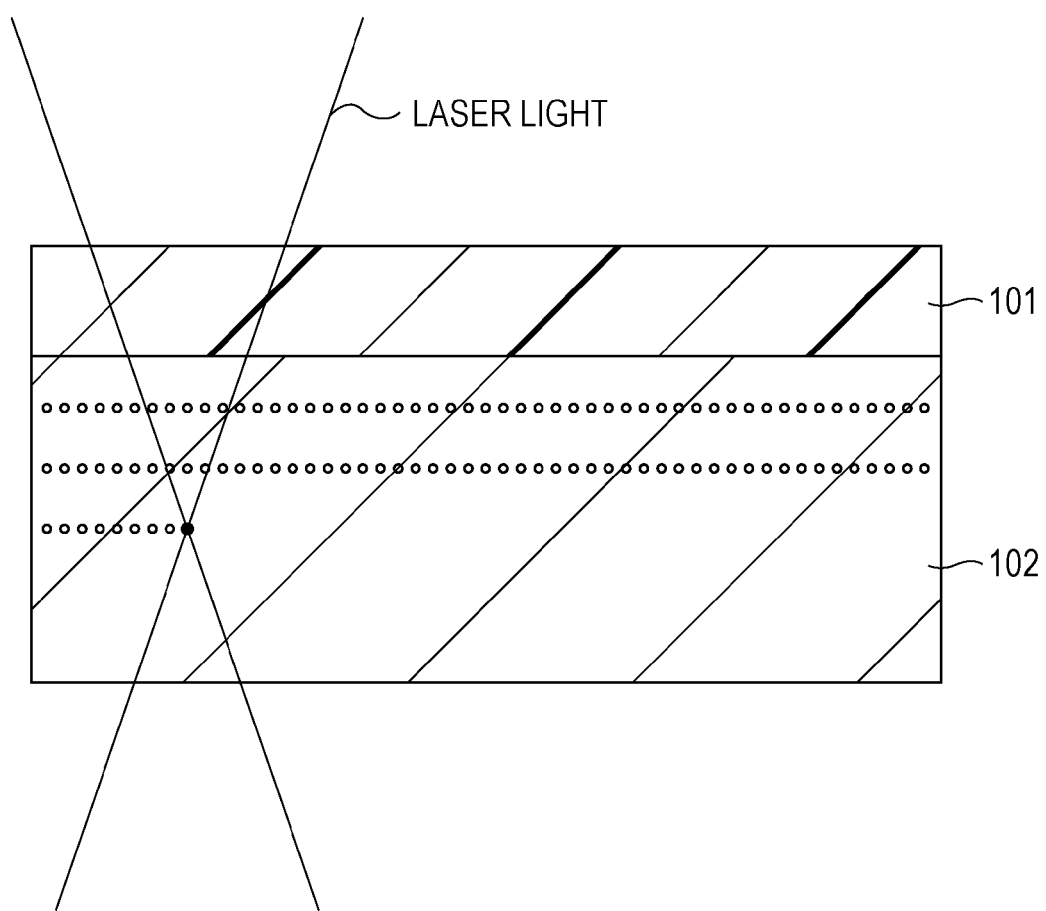
FIG. 10 is a diagram illustrating a bulk recording type.
Figure 11:
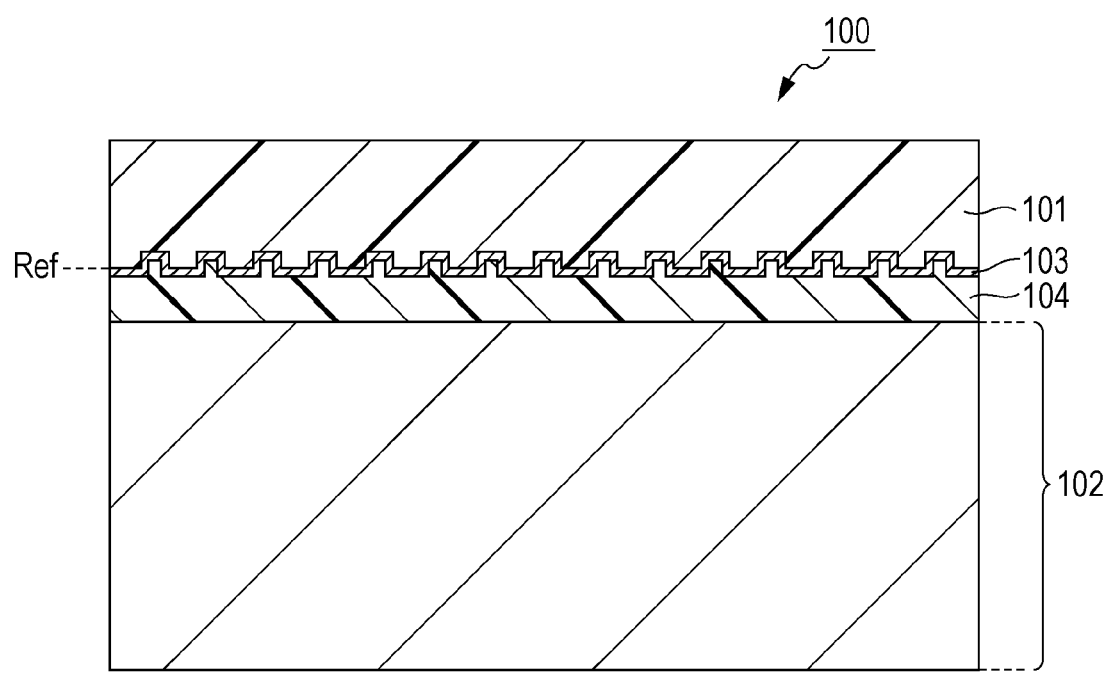
FIG. 11 is a diagram illustrating a cross-sectional structure of an actual bulk type recording medium having a reference face.

FIG. 9 is a diagram illustrating a relationship between the third-order spherical aberration variation (λrms) and the third-order comatic aberration variation (λrms) in the objective lens 20 according to Embodiment 2.

A relational expression between the third-order spherical aberration variation (x axis) and the third-order comatic aberration variation (y axis) in the objective lens 20 according to Embodiment 2 becomes y=−0.0849x+0.0117.

Therefore, a value of α in this case is α=−0.0849÷0.00873=−9.73.

It can be seen from the result that the objective lens 20 according to Embodiment 2 satisfies both the conditions in the above Equations 9 and 10.

4. Modified Example

Although the embodiments of the present disclosure have been described, the present disclosure is not limited to the detailed examples described hitherto.

For example, a detailed design example of the objective lens 20 is not limited to Embodiment 1 or Embodiment 2.

In addition, the number of groups of the objective lens 20 (the number of the lenses) is not limited to Embodiment 1 or Embodiment 2.

Although the spherical aberration correction is performed using the expander in the above description, the spherical aberration correction may be performed by other methods, such as, for example, a method of using a liquid crystal element.

Although the reference layer position Lpr is an intermediate position in the bulk layer 5 in the above description, a setting position of the reference layer position Lpr is not necessarily limited to the intermediate position of the bulk layer 5.

In addition, although, in the above description, the focus control of recording and reproduction laser light during reproduction is performed by controlling the objective lens 20 based on reflection light from the mark string recorded by the recording and reproduction laser light, during the reproduction as well, in a manner similar to the recording, a focus control of the objective lens 20 may be performed based on reflection light of servo laser light from the reference face Ref, and the focus control of the recording and reproduction laser light may be performed using the recording and reproduction light focus mechanism 15.

Although, in the above description, the case where the reference face Ref on which the reflection layer is formed is formed at the upper layer side of the recording layer as the bulk layer 5 is exemplified, the present disclosure may be appropriately applied to a case where the reference face Ref is formed at the lower layer side of the recording layer.

In addition, although, in the above description, the method where reflection light of recording and reproduction laser light and reflection light of servo laser light are sensed at the device side independently, the dichroic prism 19 is provided, and dispersion is performed using the difference in wavelengths of the light, is exemplified, instead thereof, for example, the dispersion may be performed by other methods, such as, employment of a configuration for performing dispersion using a difference in polarization directions such as, for example, p polarization and s polarization.

As such, the configuration of the optical system included in the optical pickup (optical drive device) according to the embodiments of the present disclosure may be appropriately modified.

In addition, the present disclosure is widely and appropriately applicable to an optical recording medium having a recording layer where information can be performed at a plurality of predetermined positions in the depth direction as well as the bulk type optical recording medium having a bulk-shaped recording layer.

For example, the present disclosure is also appropriately applicable to an optical recording medium having a recording layer structure where a plurality of recording films including a reflection layer and a recording material layer are formed at a predetermined interval in the depth direction.

Further, although, in the above description, the case where the present disclosure is applied to the recording and reproduction device performing both mark recording on the recording layer and reproduction of the recorded marks is exemplified, the present disclosure is also appropriately applicable to a recording device (recording-only device) which performs only mark recording on the recording layer or a reproduction device (reproduction-only device) which performs only reproduction of recorded marks.

The present disclosure contains subject matter related to that disclosed in Japanese Priority Patent Application JP 2010-204121 filed in the Japan Patent Office on Sep. 13, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens, which is provided in an optical pickup including a spherical aberration correction mechanism which performs a spherical aberration correction with respect to laser light applied to a recording layer of an optical recording medium, having the recording layer on which information can be recorded at a plurality of positions in a depth direction, via the objective lens, and a tilt correction unit which varies a lens tilt angle which is a tilt angle of the objective lens, thereby performing a tilt correction,
    wherein, when a third-order spherical aberration variation ($\lambda$rms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation ($\lambda$rms) generated by the lens tilt angle Ltilt is denoted by $\Delta CA$, and a relationship therebetween is given by $\Delta CA/Ltilt=\alpha*\Delta SA$, the objective lens is designed such that a value of $\alpha$ has a value in an allowable difference range which has an ideal value indicated by $\alpha=-6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum.

2. The objective lens according to claim 1, wherein a value of NA is 0.85, and an ideal value of $\alpha$ is $-7.44$.

3. The objective lens according to claim 2, wherein, when a wavelength of the laser light is 405 nm, an amount of an error between the reference layer position and the condensed position is $\pm 150$ μm or less, the lens tilt angle (a tilt angle of the optical recording medium) is $\pm 0.5°$ or less, and a refractive index of the optical recording medium is about 1.6, the objective lens is designed such that a value of $\alpha$ has a value in an allowable difference range due to $-19.1<\alpha<-2.9$ which is set based on a value itself of the Marechal criterion.

4. The objective lens according to claim 2, wherein, when a wavelength of the laser light is 405 nm, an amount of an error between the reference layer position and the condensed position is $\pm 150$ μm or less, the lens tilt angle (a tilt angle of the optical recording medium) is $\pm 0.5°$ or less, and a refractive index of the optical recording medium is about 1.6, the objective lens is designed such that a value of $\alpha$ has a value in an allowable difference range due to $-13.4<\alpha<-4.1$ which is set based on a half value of the Marechal criterion.

5. The objective lens according to claim 1, wherein the objective lens has a two-group configuration.

6. The objective lens according to claim 1, wherein the objective lens has a three-group configuration.

7. An optical pickup comprising:
    a spherical aberration correction mechanism that performs a spherical aberration correction with respect to laser light applied to a recording layer of an optical recording medium, having the recording layer on which information can be recorded at a plurality of positions in a depth direction, via an objective lens; and
    a tilt correction unit that varies a lens tilt angle which is a tilt angle of the objective lens, thereby performing a tilt correction,
    wherein, when a third-order spherical aberration variation ($\lambda$rms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation ($\lambda$rms) generated by the lens tilt angle Ltilt is denoted by $\Delta CA$, and a relationship therebetween is given by $\Delta CA/Ltilt=\alpha*\Delta SA$, the objective lens is designed such that a value of $\alpha$ has a value in an allowable difference range which has an ideal value indicated by $\alpha=-6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum.

8. An optical drive device comprising an optical pickup which includes:
    a spherical aberration correction mechanism that performs a spherical aberration correction with respect to laser light applied to a recording layer of an optical recording medium, having the recording layer on which information can be recorded at a plurality of positions in a depth direction, via an objective lens; and a tilt correction unit that varies a lens tilt angle which is a tilt angle of the objective lens, thereby performing a tilt correction, wherein, when a third-order spherical aberration variation ($\lambda$rms) corresponding to an error of a condensed position of the laser light with respect to a predetermined reference layer position set inside the recording layer is denoted by $\Delta SA$, the lens tilt angle (radian) is denoted by Ltilt, a third-order comatic aberration variation ($\lambda$rms) generated by the lens tilt angle Ltilt is denoted by $\Delta CA$, and a relationship therebetween is given by $\Delta CA/Ltilt = \alpha * \Delta SA$, the objective lens is designed such that a value of $\alpha$ has a value in an allowable difference range which has an ideal value indicated by $\alpha = -6.32 \cdot NA$ (where NA is an effective numerical aperture of the objective lens), as a reference, and has a value in the allowable difference range set based on the third-order comatic aberration variation $\Delta CA$ and a Marechal criterion when the third-order spherical aberration variation $\Delta SA$ is the maximum and the lens tilt angle is the maximum, and wherein the optical drive device performs information recording and/or reproduction for the optical recording medium.

* * * * *